United States Patent
Dattaray et al.

(10) Patent No.: US 10,402,230 B2
(45) Date of Patent: Sep. 3, 2019

(54) SYSTEM ALLOCATING LINKS FOR DATA PACKETS IN AN ELECTRONIC SYSTEM

(71) Applicant: Mitchell International, Inc., San Diego, CA (US)

(72) Inventors: Basab Dattaray, San Diego, CA (US); Scott Baierl, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 150 days.

(21) Appl. No.: 15/623,105

(22) Filed: Jun. 14, 2017

(65) Prior Publication Data

US 2018/0365063 A1    Dec. 20, 2018

Related U.S. Application Data

(63) Continuation-in-part of application No. 14/106,325, filed on Dec. 13, 2013, now abandoned.

(51) Int. Cl.
G06F 9/46 (2006.01)
G06F 9/50 (2006.01)
G06F 9/48 (2006.01)

(52) U.S. Cl.
CPC ............ G06F 9/505 (2013.01); G06F 9/4881 (2013.01)

(58) Field of Classification Search
None
See application file for complete search history.

(56) References Cited

U.S. PATENT DOCUMENTS

| | | | |
|---|---|---|---|
| 6,647,408 B1 | 11/2003 | Ricart et al. | |
| RE45,009 E * | 7/2014 | Vange | H04L 67/2804 370/229 |
| 2004/0244001 A1 | 12/2004 | Haller et al. | |
| 2012/0310691 A1 | 12/2012 | Carlsson et al. | |
| 2014/0344826 A1* | 11/2014 | Wu | G06F 9/4881 718/104 |
| 2015/0081360 A1 | 3/2015 | Sun et al. | |
| 2015/0170078 A1 | 6/2015 | Dattaray et al. | |
| 2017/0109199 A1* | 4/2017 | Chen | G06F 9/4881 |

OTHER PUBLICATIONS

Final Office Action for U.S. Appl. No. 14/106,325, dated Jun. 13, 2016, 21 pages.
Non-Final Office Action for U.S. Appl. No. 14/106,325, dated Feb. 19, 2016, 22 pages.
Non-Final Office Action for U.S. Appl. No. 14/106,325, dated Dec. 15, 2016, 27 pages.

* cited by examiner

*Primary Examiner* — Kenneth Tang
(74) *Attorney, Agent, or Firm* — Kilpatrick Townsend & Stockton LLP

(57) ABSTRACT

Methods and systems for performing the methods are disclosed. The methods include splitting a large execution load/execution component link generation job, into a number of smaller execution load/execution component link generation jobs, and conditionally subsplitting one or more of the smaller execution load/execution component link generation jobs. The methods also include solving each of the smaller execution load/execution component link generation jobs to generate links between data packets corresponding with execution loads of each smaller execution load/execution component link generation job and data packets corresponding with execution components of each smaller execution load/execution component link generation job.

18 Claims, 15 Drawing Sheets

Job Splitter

S 110    Read the split_threshold_setting, density_tolerance_setting and weight_threshold_setting S 120    *If* ( number-of-tasks + number-of-resources < split_threshold_setting) then exit S 130    overall-density =
(number-of-tasks + number-of-resources) / (rectangular area occupied by tasks and resources)

S 140    Call RecursiveCreateTree(Large Job)

S 150    Procedure RecursiveCreateTree (Job)
For Each portion of Job

S 152   Create New_Job, associate tasks and servicers of the current portion with New_Job, identify New_Job as child of Job.

S 154   weight = (number-of-tasks + number-of-resources)

S 156   *If* (weight > weight_threshold_setting)
     S 158   { Call RecursiveCreateTree (New_Job) } }

S 160    Create TouchingJobList ordered list of geographically connected Jobs created in tree S 170    Create empty GroupList
Create empty JobGroup and add to the GroupList
NextJob = next Job from TouchingJobList
*While* (NextJob exists)
{
   add resources and tasks of NextJob to JobGroup
   density = (number-of-tasks + number-of-resources) / (rectangular area occupied by JobGroup)
   *If* (overall-density – density_tolerance_setting < density < overall-density + density_tolerance_setting)
   { Create next empty JobGroup and add to the GroupList }
   get new NextJob
}

FIGURE 10

![Figure 13 - quadtree diagram rotated 90°]

| | | 1.2.3.2 12 | 1.2.3.3 13 |
| | 1.2.3.1 16 | 1.2.3.4 144 | |
| 1.2.2 35 | 1.2.3 185 | | |
| 1.2.1 75 | 1.2.4 45 | | |

SYSTEM ALLOCATING LINKS FOR DATA PACKETS IN AN ELECTRONIC SYSTEM

CROSS-REFERENCE TO RELATED APPLICATIONS

This application is a continuation-in-part of U.S. patent application Ser. No. 14/106,325, filed on Dec. 13, 2013 and entitled "SYSTEM AND METHOD OF ALLOCATING LARGE NUMBERS OF TASKS," the contents of which are incorporated herein by reference in its entirety.

BACKGROUND

The present application generally relates to systems which generate links between sets of data packets corresponding with execution loads and sets of data packets corresponding with execution components, and more particularly to systems which generate links between data packets corresponding with execution loads and data packets corresponding with execution components, where each of the data packets corresponding with execution loads and each of the data packets corresponding with execution components are associated with a physical location.

Determining which data packets corresponding with execution loads should be linked with which data packets corresponding with execution components is complex and can require large amounts of computing resources to perform. Because the calculation is NP (nondeterministic polynomial)-complete, an optimum solution may be found only by considering all possible solutions, and comparing the solutions based on a metric or rule whose outcome is to be optimized.

The burden for finding an optimum solution increases exponentially with the number of execution loads and the number of execution components. Because all possible solutions are determined, linking the data packets corresponding with the execution loads with the data packets corresponding with the execution components is impractical for situations having more than a few execution loads and execution components.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of generating links between a plurality of data packets corresponding with execution loads to a plurality of data packets corresponding with execution components, the data packets corresponding with execution loads and the data packets corresponding with execution components being part of a large execution load/execution component link generation job, the method including: calculating an overall metric of the large execution load/execution component link generation job, where the overall metric is determined based at least in part on a quantity of execution loads of the large execution load/execution component link generation job and a quantity of execution components of the large execution load/execution component link generation job. The method of generating links also includes splitting the large execution load/execution component link generation job into a plurality of smaller execution load/execution component link generation jobs, where each of the smaller execution load/execution component link generation jobs includes a plurality of execution loads and execution components where each particular smaller execution load/execution component link generation job has a job metric determined based at least in part on the quantity of execution loads of the particular smaller execution load/execution component link generation job and the quantity of execution components of the particular smaller execution load/execution component link generation job, and where a difference between the job metric of each of the smaller execution load/execution component link generation jobs and the overall metric of the large execution load/execution component link generation job is less than a metric threshold. The method of generating links also includes solving each smaller execution load/execution component link generation jobs, where links are generated between the data packets corresponding with execution loads of each smaller execution load/execution component link generation job and the data packets corresponding with execution components of each smaller execution load/execution component link generation job. The method of generating links also includes communicating the generated links to the corresponding execution components. Other embodiments of this aspect include corresponding computer systems, apparatus, and computer programs recorded on one or more computer storage devices, each configured to perform the actions of the methods.

Implementations may include one or more of the following features. The method where the overall metric is an overall density, and where the job metrics are job densities. The method may also include where the overall density is the quantity of execution loads of the large execution load/execution component link generation job divided by a quantity of the execution loads and execution components of the large execution load/execution component link generation job. The method may also include where a job density of each particular smaller execution load/execution component link generation job is the quantity of execution loads of the particular smaller execution load/execution component link generation job divided by quantity of the execution loads and services of the particular smaller execution load/execution component link generation job. The method where a physical region corresponding with each particular smaller execution load/execution component link generation job is contiguous. The method where the large execution load/execution component link generation job corresponds with a physical region, and where splitting the large execution load/execution component link generation job into a plurality of smaller execution load/execution component link generation jobs includes: splitting the physical region of the large execution load/execution component link generation job into a plurality of sections, where each section has a physical region and has one or more execution loads and execution components therein, and where a quantity of execution loads and execution components within each section is less than a quantity threshold. The method may also include selecting one or more of the sections for each smaller execution load/execution component link generation job, where each smaller execution load/execution component link generation job includes the execution loads and execution components of the selected sections. The method where splitting the physical region of the large execution load/execution component link generation job into a plurality of sections includes: splitting the physical region of the large execution load/execution component link generation job into four areas, where each area has one or more execution loads and execution components therein. The method may also include determining the quantity of execution loads and execution components of each particular area. The method may also include subsplitting each particular area having a quantity of execution loads and execution components greater than the quantity threshold into four sub-areas. The method may also include determining the quantity of execution loads and execution components of each particular sub-area. The method may also include subsplitting each particular sub-area having a quantity of execution loads and execution components greater than the quantity threshold into four additional sub-areas. The method may also include determining the quantity of execution loads and execution components of each particular additional sub-area. The method may also include subsplitting each particular additional sub-area having a quantity of execution loads and execution components greater than the quantity threshold into four additional sub-areas, until all sub-areas and additional sub-areas have a quantity of execution loads and execution components less than or equal to the quantity threshold. The method where the four areas are substantially equal in size. The method where selecting the sections for each smaller execution load/execution component link generation job includes: generating an ordered list of sections. The method may also include adding a first section from the ordered list to a particular smaller execution load/execution component link generation job. The method may also include calculating a job metric for the particular smaller execution load/execution component link generation job. The method may also include calculating a difference between the determined job metric of the particular smaller execution load/execution component link generation job and the overall metric of the large execution load/execution component link generation job. The method may also include in response to the determined difference being greater than the metric threshold, adding a next section from the ordered list to the particular smaller execution load/execution component link generation job. The method may also include in response to the determined difference being less than the metric threshold, generating a next smaller execution load/execution component link generation job. The computer system where the overall metric is an overall density, and where the job metrics are job densities. The computer system may also include where the overall density is the quantity of execution loads of the large execution load/execution component link generation job divided by the quantity of the execution loads and execution components of the large execution load/execution component link generation job. The computer system may also include where the job density of each particular smaller execution load/execution component link generation job is the quantity of execution loads of the particular smaller execution load/execution component link generation job divided by quantity of the execution loads and services of the particular smaller execution load/execution component link generation job. The computer system where the physical region of each particular smaller execution load/execution component link generation job is contiguous. The computer system where the large execution load/execution component link generation job corresponds with a physical region, and where splitting the large execution load/execution component link generation job into a plurality of smaller execution load/execution component link generation jobs includes: splitting the physical region of the large execution load/execution component link generation job into a plurality of sections, where each section has a physical region and has one or more execution loads and execution components therein, and where the quantity of execution loads and execution components within each section is less than a quantity threshold. The computer system may also include selecting one or more of the sections for each smaller execution load/execution component link generation job, where each smaller execution load/execution component link generation job includes the execution loads and execution components of the selected sections. The computer system where splitting the physical region of the large execution load/execution component link generation job into a plurality of sections includes: splitting the physical region of the large execution load/execution component link generation job into four areas, where each area has one or more execution loads and execution components therein. The computer system may also include determining the quantity of execution loads and execution components of each particular area. The computer system may also include subsplitting each particular area having a quantity of execution loads and execution components greater than the quantity threshold into four sub-areas. The computer system may also include determining the quantity of execution loads and execution components of each particular sub-area. The computer system may also include subsplitting each particular sub-area having a quantity of execution loads and execution components greater than the quantity threshold into four additional sub-areas. The computer system may also include determining the quantity of execution loads and execution components of each particular additional sub-area. The computer system may also include subsplitting each particular additional sub-area having a quantity of execution loads and execution components greater than the quantity threshold into four additional sub-areas, until all sub-areas and additional sub-areas have a quantity of execution loads and execution components less than or equal to the quantity threshold. The computer system where the four areas are substantially equal in size. The computer system where selecting the sections for each smaller execution load/execution component link generation job includes: generating an ordered list of sections. The computer system may also include adding a first section from the ordered list to a particular smaller execution load/execution component link generation job. The computer system may also include calculating a job metric for the particular smaller execution load/execution component link generation job. The computer system may also include calculating a difference between the determined job metric of the particular smaller execution load/execution component link generation job and the overall metric of the large execution load/execution component link generation job. The computer system may also include in response to the determined difference being greater than the metric threshold, adding a next section from the ordered list to the particular smaller execution load/execution component link generation job. The computer system may also include in response to the determined difference being less than the metric threshold, generating a next smaller execution load/execution component link generation job. The computer readable medium where the overall metric is an overall density, and where the job metrics are job densities. The computer readable medium may also include where the overall density is the quantity of execution loads of the large execution load/execution component link generation job divided by the quantity of the execution loads and execution components of the large execution load/execution component link generation job. The computer readable medium may also include where the job density of each particular smaller execution load/execution component link generation job is the quantity of execution loads of the particular smaller execution load/execution component link generation job divided by quantity of the execution loads and services of the particular smaller execution load/execution component link generation job. The computer readable medium where the physical region of each particular smaller execution load/execution component link generation job is contiguous. The computer readable medium where the large execution load/execution component link generation job corresponds with a physical region, and where splitting the large execution load/execution component link generation job into a plurality of smaller execution load/execution component link generation jobs includes: splitting the physical region of the large execution load/execution component link generation job into a plurality of sections, where each section has a physical region and has one or more execution loads and execution components therein, and where the quantity of execution loads and execution components within each section is less than a quantity threshold. The computer readable medium may also include selecting one or more of the sections for each smaller execution load/execution component link generation job, where each smaller execution load/execution component link generation job includes the execution loads and execution components of the selected sections. The computer readable medium where splitting the physical region of the large execution load/execution component link generation job into a plurality of sections includes: splitting the physical region of the large execution load/execution component link generation job into four areas, where each area has one or more execution loads and execution components therein. The computer readable medium may also include determining the quantity of execution loads and execution components of each particular area. The computer readable medium may also include subsplitting each particular area having a quantity of execution loads and execution components greater than the quantity threshold into four sub-areas. The computer readable medium may also include determining the quantity of execution loads and execution components of each particular sub-area. The computer readable medium may also include subsplitting each particular sub-area having a quantity of execution loads and execution components greater than the quantity threshold into four additional sub-areas. The computer readable medium may also include determining the quantity of execution loads and execution components of each particular additional sub-area. The computer readable medium may also include subsplitting each particular additional sub-area having a quantity of execution loads and execution components greater than the quantity threshold into four additional sub-areas, until all sub-areas and additional sub-areas have a quantity of execution loads and execution components less than or equal to the quantity threshold. The computer readable medium where the four areas are substantially equal in size. The computer readable medium where selecting the sections for each smaller execution load/execution component link generation job includes: generating an ordered list of sections. The computer readable medium may also include adding a first section from the ordered list to a particular smaller execution load/execution component link generation job. The computer readable medium may also include calculating a job metric for the particular smaller execution load/execution component link generation job. The computer readable medium may also include calculating a difference between the determined job metric of the particular smaller execution load/execution component link generation job and the overall metric of the large execution load/execution component link generation job. The computer readable medium may also include in response to the determined difference being greater than the metric threshold, adding a next section from the ordered list to the particular smaller execution load/execution component link generation job. The computer readable medium may also include in response to the determined difference being less than the metric threshold, generating a next smaller execution load/execution component link generation job. Implementations of the described techniques may include hardware, a method or process, or computer software on a computer-accessible medium.

One general aspect includes a computer system, including: a processor; and a memory, including instructions, which, when executed by the processor, cause the computer system to perform a method of generating links between a plurality of data packets corresponding with execution loads to a plurality of data packets corresponding with execution components, the data packets corresponding with execution loads and the data packets corresponding with execution components being part of a large execution load/execution component link generation job, the method including: The computer system also includes calculating an overall metric of the large execution load/execution component link generation job, where the overall metric is determined based at least in part on the quantity of execution loads of the large execution load/execution component link generation job and the quantity of execution components of the large execution load/execution component link generation job. The computer system also includes splitting the large execution load/execution component link generation job into a plurality of smaller execution load/execution component link generation jobs, where each of the smaller execution load/execution component link generation jobs includes a plurality of execution loads and execution components where each particular smaller execution load/execution component link generation job has a job metric determined based at least in part on the quantity of execution loads of the particular smaller execution load/execution component link generation job and the quantity of execution components of the particular smaller execution load/execution component link generation job, and where a difference between the job metric of each of the smaller execution load/execution component link generation jobs and the overall metric of the large execution load/execution component link generation job is less than a metric threshold. The computer system also includes solving each smaller execution load/execution component link generation jobs, where links are generated between the data packets corresponding with execution loads of each smaller execution load/execution component link generation job and the data packets corresponding with execution components of each smaller execution load/execution component link generation job. The computer system also includes communicating the generated links to the corresponding execution components. Other embodiments of this aspect include corresponding computer systems, apparatus, and computer programs recorded on one or more computer storage devices, each configured to perform the actions of the methods.

Implementations may include one or more of the following features. The computer system where the overall metric is an overall density, and where the job metrics are job densities. The computer system may also include where the overall density is the quantity of execution loads of the large execution load/execution component link generation job divided by the quantity of the execution loads and execution components of the large execution load/execution component link generation job. The computer system may also include where the job density of each particular smaller execution load/execution component link generation job is the quantity of execution loads of the particular smaller execution load/execution component link generation job divided by quantity of the execution loads and services of the particular smaller execution load/execution component link generation job. The computer system where the physical region of each particular smaller execution load/execution component link generation job is contiguous. The computer system where the large execution load/execution component link generation job corresponds with a physical region, and where splitting the large execution load/execution component link generation job into a plurality of smaller execution load/execution component link generation jobs includes: splitting the physical region of the large execution load/execution component link generation job into a plurality of sections, where each section has a physical region and has one or more execution loads and execution components therein, and where the quantity of execution loads and execution components within each section is less than a quantity threshold. The computer system may also include selecting one or more of the sections for each smaller execution load/execution component link generation job, where each smaller execution load/execution component link generation job includes the execution loads and execution components of the selected sections. The computer system where splitting the physical region of the large execution load/execution component link generation job into a plurality of sections includes: splitting the physical region of the large execution load/execution component link generation job into four areas, where each area has one or more execution loads and execution components therein. The computer system may also include determining the quantity of execution loads and execution components of each particular area. The computer system may also include subsplitting each particular area having a quantity of execution loads and execution components greater than the quantity threshold into four sub-areas. The computer system may also include determining the quantity of execution loads and execution components of each particular sub-area. The computer system may also include subsplitting each particular sub-area having a quantity of execution loads and execution components greater than the quantity threshold into four additional sub-areas. The computer system may also include determining the quantity of execution loads and execution components of each particular additional sub-area. The computer system may also include subsplitting each particular additional sub-area having a quantity of execution loads and execution components greater than the quantity threshold into four additional sub-areas, until all sub-areas and additional sub-areas have a quantity of execution loads and execution components less than or equal to the quantity threshold. The computer system where the four areas are substantially equal in size. The computer system where selecting the sections for each smaller execution load/execution component link generation job includes: generating an ordered list of sections. The computer system may also include adding a first section from the ordered list to a particular smaller execution load/execution component link generation job. The computer system may also include calculating a job metric for the particular smaller execution load/execution component link generation job. The computer system may also include calculating a difference between the determined job metric of the particular smaller execution load/execution component link generation job and the overall metric of the large execution load/execution component link generation job. The computer system may also include in response to the determined difference being greater than the metric threshold, adding a next section from the ordered list to the particular smaller execution load/execution component link generation job. The computer system may also include in response to the determined difference being less than the metric threshold, generating a next smaller execution load/execution component link generation job. The computer readable medium where the overall metric is an overall density, and where the job metrics are job densities. The computer readable medium may also include where the overall density is the quantity of execution loads of the large execution load/execution component link generation job divided by the quantity of the execution loads and execution components of the large execution load/execution component link generation job. The computer readable medium may also include where the job density of each particular smaller execution load/execution component link generation job is the quantity of execution loads of the particular smaller execution load/execution component link generation job divided by quantity of the execution loads and services of the particular smaller execution load/execution component link generation job. The computer readable medium where the physical region of each particular smaller execution load/execution component link generation job is contiguous. The computer readable medium where the large execution load/execution component link generation job corresponds with a physical region, and where splitting the large execution load/execution component link generation job into a plurality of smaller execution load/execution component link generation jobs includes: splitting the physical region of the large execution load/execution component link generation job into a plurality of sections, where each section has a physical region and has one or more execution loads and execution components therein, and where the quantity of execution loads and execution components within each section is less than a quantity threshold. The computer readable medium may also include selecting one or more of the sections for each smaller execution load/execution component link generation job, where each smaller execution load/execution component link generation job includes the execution loads and execution components of the selected sections. The computer readable medium where splitting the physical region of the large execution load/execution component link generation job into a plurality of sections includes: splitting the physical region of the large execution load/execution component link generation job into four areas, where each area has one or more execution loads and execution components therein. The computer readable medium may also include determining the quantity of execution loads and execution components of each particular area. The computer readable medium may also include subsplitting each particular area having a quantity of execution loads and execution components greater than the quantity threshold into four sub-areas. The computer readable medium may also include determining the quantity of execution loads and execution components of each particular sub-area. The computer readable medium may also include subsplitting each particular sub-area having a quantity of execution loads and execution components greater than the quantity threshold into four additional sub-areas. The computer readable medium may also include determining the quantity of execution loads and execution components of each particular additional sub-area. The computer readable medium may also include subsplitting each particular additional sub-area having a quantity of execution loads and execution components greater than the quantity threshold into four additional sub-areas, until all sub-areas and additional sub-areas have a quantity of execution loads and execution components less than or equal to the quantity threshold. The computer readable medium where the four areas are substantially equal in size. The computer readable medium where selecting the sections for each smaller execution load/execution component link generation job includes: generating an ordered list of sections. The computer readable medium may also include adding a first section from the ordered list to a particular smaller execution load/execution component link generation job. The computer readable medium may also include calculating a job metric for the particular smaller execution load/execution component link generation job. The computer readable medium may also include calculating a difference between the determined job metric of the particular smaller execution load/execution component link generation job and the overall metric of the large execution load/execution component link generation job. The computer readable medium may also include in response to the determined difference being greater than the metric threshold, adding a next section from the ordered list to the particular smaller execution load/execution component link generation job. The computer readable medium may also include in response to the determined difference being less than the metric threshold, generating a next smaller execution load/execution component link generation job. Implementations of the described techniques may include hardware, a method or process, or computer software on a computer-accessible medium.

One general aspect includes a computer readable medium including non-transient instructions, which, when executed by a computer system cause the computer system to perform a method of generating links between a plurality of data packets corresponding with execution loads to a plurality of data packets corresponding with execution components, the data packets corresponding with execution loads and the data packets corresponding with execution components being part of a large execution load/execution component link generation job, the method including: calculating an overall metric of the large execution load/execution component link generation job, where the overall metric is determined based at least in part on the quantity of execution loads of the large execution load/execution component link generation job and the quantity of execution components of the large execution load/execution component link generation job; splitting the large execution load/execution component link generation job into a plurality of smaller execution load/execution component link generation jobs, where each of the smaller execution load/execution component link generation jobs includes a plurality of execution loads and execution components where each particular smaller execution load/execution component link generation job has a job metric determined based at least in part on the quantity of execution loads of the particular smaller execution load/execution component link generation job and the quantity of execution components of the particular smaller execution load/execution component link generation job, and where a difference between the job metric of each of the smaller execution load/execution component link generation jobs and the overall metric of the large execution load/execution component link generation job is less than a metric threshold; solving each smaller execution load/execution component link generation jobs, where links are generated between the data packets corresponding with execution loads of each smaller execution load/execution component link generation job and the data packets corresponding with execution components of each smaller execution load/execution component link generation job; and communicating the generated links to the corresponding execution components. Other embodiments of this aspect include corresponding computer systems, apparatus, and computer programs recorded on one or more computer storage devices, each configured to perform the actions of the methods.

Implementations may include one or more of the following features. The computer readable medium where the overall metric is an overall density, and where the job metrics are job densities. The computer readable medium may also include where the overall density is the quantity of execution loads of the large execution load/execution component link generation job divided by the quantity of the execution loads and execution components of the large execution load/execution component link generation job. The computer readable medium may also include where the job density of each particular smaller execution load/execution component link generation job is the quantity of execution loads of the particular smaller execution load/execution component link generation job divided by quantity of the execution loads and services of the particular smaller execution load/execution component link generation job. The computer readable medium where the physical region of each particular smaller execution load/execution component link generation job is contiguous. The computer readable medium where the large execution load/execution component link generation job corresponds with a physical region, and where splitting the large execution load/execution component link generation job into a plurality of smaller execution load/execution component link generation jobs includes: splitting the physical region of the large execution load/execution component link generation job into a plurality of sections, where each section has a physical region and has one or more execution loads and execution components therein, and where the quantity of execution loads and execution components within each section is less than a quantity threshold. The computer readable medium may also include selecting one or more of the sections for each smaller execution load/execution component link generation job, where each smaller execution load/execution component link generation job includes the execution loads and execution components of the selected sections. The computer readable medium where splitting the physical region of the large execution load/execution component link generation job into a plurality of sections includes: splitting the physical region of the large execution load/execution component link generation job into four areas, where each area has one or more execution loads and execution components therein. The computer readable medium may also include determining the quantity of execution loads and execution components of each particular area. The computer readable medium may also include subsplitting each particular area having a quantity of execution loads and execution components greater than the quantity threshold into four sub-areas. The computer readable medium may also include determining the quantity of execution loads and execution components of each particular sub-area. The computer readable medium may also include subsplitting each particular sub-area having a quantity of execution loads and execution components greater than the quantity threshold into four additional sub-areas. The computer readable medium may also include determining the quantity of execution loads and execution components of each particular additional sub-area. The computer readable medium may also include subsplitting each particular additional sub-area having a quantity of execution loads and execution components greater than the quantity threshold into four additional sub-areas, until all sub-areas and additional sub-areas have a quantity of execution loads and execution components less than or equal to the quantity threshold. The computer readable medium where the four areas are substantially equal in size. The computer readable medium where selecting the sections for each smaller execution load/execution component link generation job includes: generating an ordered list of sections. The computer readable medium may also include adding a first section from the ordered list to a particular smaller execution load/execution component link generation job. The computer readable medium may also include calculating a job metric for the particular smaller execution load/execution component link generation job. The computer readable medium may also include calculating a difference between the determined job metric of the particular smaller execution load/execution component link generation job and the overall metric of the large execution load/execution component link generation job. The computer readable medium may also include in response to the determined difference being greater than the metric threshold, adding a next section from the ordered list to the particular smaller execution load/execution component link generation job. The computer readable medium may also include in response to the determined difference being less than the metric threshold, generating a next smaller execution load/execution component link generation job. Implementations of the described techniques may include hardware, a method or process, or computer software on a computer-accessible medium.

BRIEF DESCRIPTION OF THE DRAWINGS

FIG. 10 is a structured flowchart diagram illustrating a more detailed method used by a computer of the FIG. 1 system, such as a server, to split a large execution load/execution component linking job into a number of smaller separate execution load/execution component linking jobs.

FIG. 13 illustrates a subsplit job of FIG. 12.
FIG. 14 illustrates a subsplit job of FIG. 13.

DETAILED DESCRIPTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

In order to link data packets corresponding with execution loads to more than a few data packets corresponding with execution components, finding an optimum solution may be impractical. However, using embodiments of systems described herein, a near optimum solution may be determined using a practical amount of computing resources.

Figure 1:
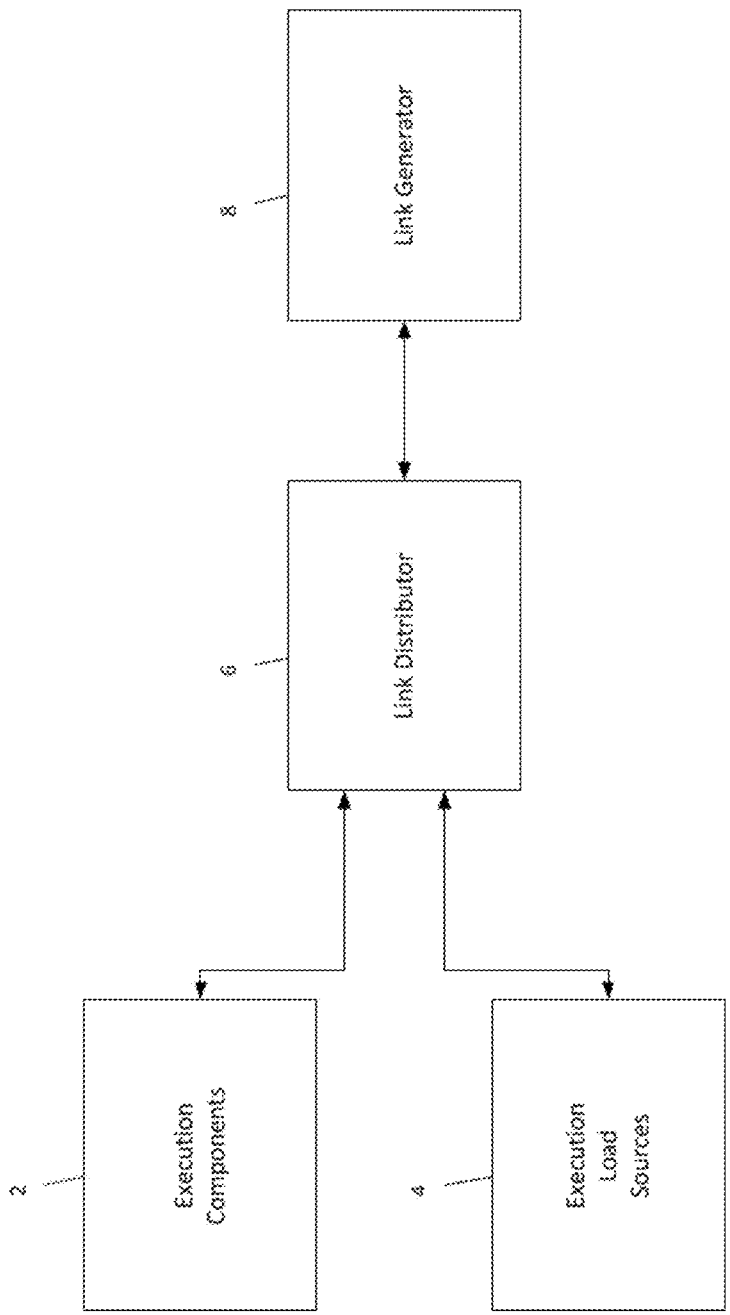
FIG. 1 is a schematic illustration of an exemplary execution load/execution component linking system.

FIG. 1 is a schematic illustration of an exemplary link generation system. The system includes data packets corresponding with execution components 2, which provide data, for example, regarding execution component characteristics, to a link distribution module 6, for example, via an electronic communications network connecting the two. The system of FIG. 1 also includes sources of execution loads 4, which generate execution loads for the link distribution module 6, and which are communicated to the link distribution module 6, for example, via an electronic communications network connecting the two. In some embodiments, the execution load sources 4 may generate instructions for links to be generated between a plurality of data packets corresponding with execution loads and a plurality of data packets corresponding with execution components. Although the data packets corresponding with execution components 2 are represented by a single box in FIG. 1, it should be understood that a plurality of data packets corresponding with execution components are represented by the single box. Similarly, the execution load sources 4 are represented by a single box in FIG. 1, but comprise or represent a plurality of execution load sources.

The link distribution module 6 receives the data from the data packets corresponding with execution components 2 and the instructions from execution load sources 4. The data and the instructions may be packaged and delivered from the link distribution module 6 to a link generation module 8, for example, via an electronic communications network connecting the two.

The link generation module 8 receives the data regarding the data packets corresponding with execution components 2 and the instructions for links to be generated between the data packets corresponding with execution loads and the data packets corresponding with execution components and generates the links. Once the links have been generated, the link generation module 8 communicates the links to the link distribution module 6 via the network. The link distribution module 6 communicates the links for each execution component to the corresponding execution components via the network. In some embodiments, the link distribution module 6 also communicates the links for each execution load source to the respective execution load sources via the network.

Figure 2:
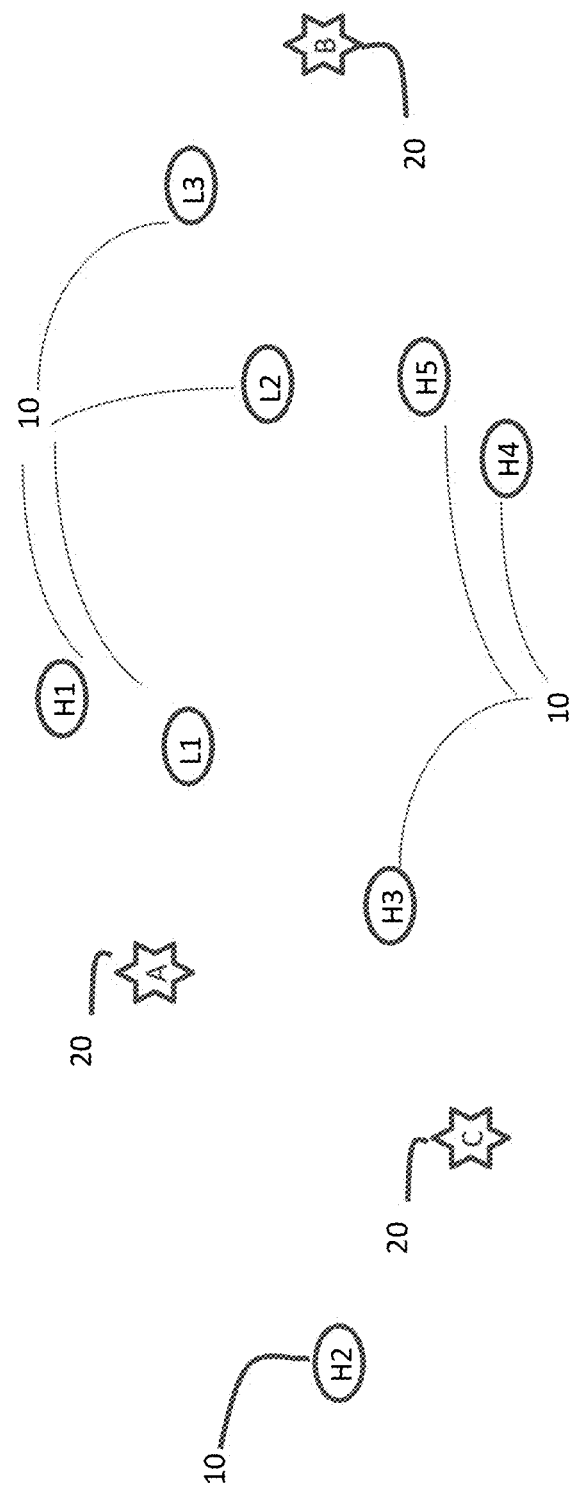
FIG. 2 is a graphical representation of an execution load/execution component link job for an execution load linking system.

FIG. 2 is a graphical representation of an execution load/execution component link generation job for a system, such as that illustrated in FIG. 1. While the illustrated specific example may be small enough that the optimum solution may be practical, the example is for discussion purposes, and is used to illustrate various aspects and principles that may be applied to execution load/execution component link calculations that are large enough that determining the optimum solution is not practical.

The execution load/execution component link generation job presented in FIG. 2 includes multiple execution components 20 and multiple execution loads 10, which, for example, are to be completed according to a deadline considered during the execution load allocation process. For example, the execution loads 10 may be due for completion by a deadline. In some embodiments, execution loads may be due for completion by another limit, for example, by a next minute, by a next day, or by a next other limit. In the example of FIG. 2, each of the execution loads 10 is given a priority ranking of "H" (high) or "L" (low). In addition, each of the execution loads 10 is given an execution load number for identification, where the execution load number is appended to the given ranking. Accordingly, it can be seen that there are five high-ranked tasks labeled H1-H5, and there are also three low-ranked tasks labeled L1-L3. In addition, FIG. 2 shows there are three execution components 20 labeled A, B, and C. Data packets corresponding with the execution loads are to be linked to data packets corresponding with the execution components 20 so that the execution loads 10 may be completed by execution components 20 before the deadline.

Each of the execution components 20 has attributes, which may be predetermined. For example, each execution component 20 may be associated with a physical location. Additional execution component attributes may include certifications for certain types of execution loads, or an affinity for certain execution load sources or certain types of execution load sources. For example, each execution component 20 may be required for, or may be precluded from performing execution loads from certain execution load sources. In some embodiments, execution component attributes may include at least one attribute of a set of attributes including: physical location, one or more capabilities, and one or more availability slots. The execution components 20 may have other attributes.

Each of the execution loads 10 has attributes, which may be predetermined. For example, each execution load 10 may be associated with a physical location at which the execution load is to be performed. In addition, each of the execution loads 10 may have an availability slot. Additional execution load attributes may include a type of execution load, or that the execution load has special requirements. Execution load attributes may additionally or alternatively include an affinity indicator or designator for certain execution components. For example, each execution load may have a list of one or more required or precluded execution components. In some embodiments, execution load attributes additionally or alternatively may include one or more of a start time limit or an end time limit. The execution components 10 may have other attributes as well.

Figure 3:
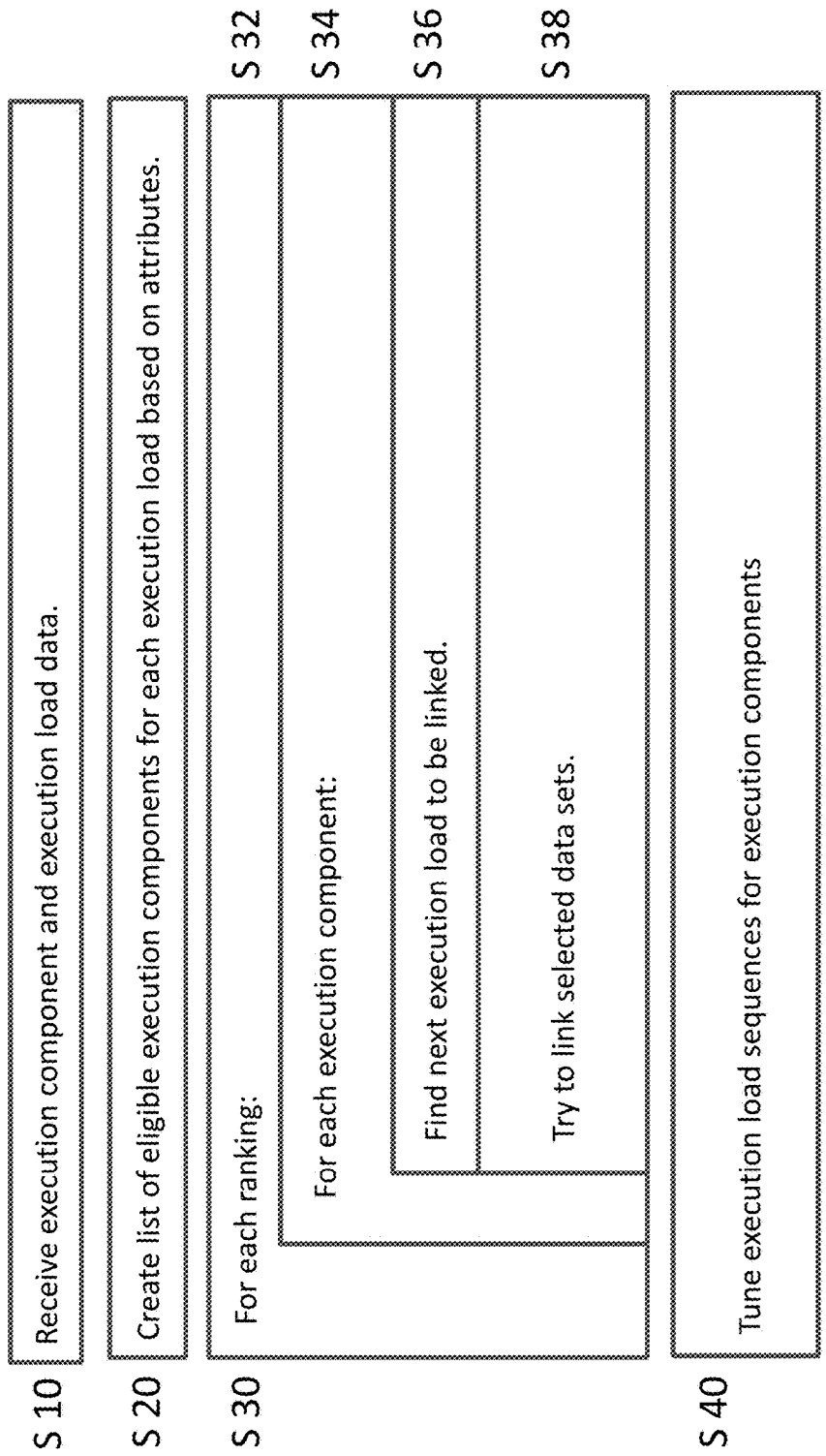
FIG. 3 is a structured flowchart diagram illustrating an embodiment of a method of generating links between sets of data packets corresponding with execution loads and sets of data packets corresponding with execution components.

FIG. 3 is a structured flowchart diagram illustrating a method performed by a computer system to generate links between sets of data packets corresponding with execution loads and sets of data packets corresponding with execution components as described herein.

At S 10, the computer system receives data packets corresponding with execution loads and data packets corresponding with execution components. The data packets may include data representing the physical locations associated with each of the execution loads and with each of the execution components. The data packets may also include data representing execution component attributes and execution load attributes. In some embodiments, the data packets are tested by the computer to ensure validity and usability of the data packets before further proceeding.

At S 20, the computer system generates a list of eligible data packets corresponding with execution components for each data packet corresponding with an execution load. For example, each data packet corresponding with an execution load may have predetermined requirements as defined by its execution load attributes. In addition, based on the execution component attributes, each data packet corresponding with an execution component has predetermined qualifications that may qualify or disqualify the corresponding execution component from performing the corresponding execution load. At S 20, for each data packet corresponding with an execution load, the computer system generates a list of eligible data packets corresponding with execution components based on the corresponding execution load attributes and the corresponding execution component attributes. As a result, for each data packet corresponding with an execution load, a list of data packets corresponding with eligible qualified execution components is generated.

In some embodiments, a metric called a "center of gravity" is determined for each of the execution components. The center of gravity metric may be based on, for example, the physical location of the execution component and all execution loads within a specified distance of the physical location of the execution component. In some embodiments, the center of gravity is determined based at least in part on the physical locations of a specified quantity of execution loads. For example, the center of gravity may be based on the ten execution loads nearest a physical location of the execution component, such as the ten execution loads nearest the execution component. The center of gravity may be determined, for example, as a geometric mean of the physical locations on which the metric is based. The center of gravity may be determined in other ways, and using other sets of data.

S 30 is an iterative loop of operations, by which the computer system generates links between the data packets corresponding with the execution loads and the data packets corresponding with the execution components based in part on the lists of eligible execution components generated in operation S 20.

To do this, at S 32, the computer system determines a set of data packets corresponding with the execution loads having the highest ranking and continuing through each next highest ranking. For example, at a first occurrence of S 32, the computer system uses data packets corresponding with the execution loads having the highest ranking, and, at subsequent occurrences of S 32, iteratively changes the ranking used towards levels of less ranking as links between the data packets corresponding with the execution loads and the data packets corresponding with the execution components are generated. Initially, the computer may select all of the un-linked data packets corresponding with execution loads having the highest ranking in a particular iteration, for inclusion in the set of data packets corresponding with execution loads to be linked to execution components. As a result, data packets corresponding with execution loads are linked to data packets corresponding with execution components in order of ranking of the data packets corresponding with the execution loads, starting with the highest and proceeding to the lowest. For each set of data packets corresponding with execution loads determined at S 32, the computer system performs S 34, S 36, and S 38, as described further below. Once the computer system has performed S 34, S 36, and S 38 for each of the sets of data packets corresponding with execution loads determined at S 32, the computer system performs the operation S 40 described below.

At S 34, the computer selects a next data packet corresponding with an execution component as a candidate for linking to one of the data packets corresponding with the execution loads. For example, the computer may select a data packet corresponding with an execution component having a greatest availability. Other methods of selecting a next data packet corresponding with an execution component may be used. After a next data packet corresponding with an execution component is selected, the computer system proceeds to S 36.

At S 36, from the set of data packets corresponding with execution loads determined at S 32, the computer system selects a next data packet corresponding with an execution load as a candidate for linking. To do this, the computer selects one of the as yet un-linked data packets corresponding with execution loads of the set determined at S 32. In some embodiments, the selection of the un-linked data packet corresponding with an execution load of the set is arbitrary. In such cases, the selection may be done, for example, in numeric order, alphabetically, or according to another execution load attribute.

In some embodiments, the selection is performed according to other selection criteria. For example, the computer system may select the un-linked data packet corresponding with an execution load of the set having a physical location which is nearest the physical location of the data packet corresponding with the execution load most recently linked to the data packet corresponding with the execution component selected at S 34.

In some embodiments, the computer system selects the data packet corresponding with an execution load of the set which has a physical location nearest the center of gravity of the data packet corresponding with the execution component selected at S 34. In some embodiments, the computer system selects the data packet corresponding with an execution load of the set which has a physical location nearest the center of gravity of the data packet corresponding with the execution component selected at S 34 if the data packet corresponding with the execution component selected at S 34 has not been previously linked to other data packets corresponding with execution loads. In some embodiments, the computer system selects the data packet corresponding with the execution load of the set which has a physical location nearest the physical location of the data packet corresponding with the execution load most recently linked to the data packet corresponding with the execution component selected at S 34 if the data packet corresponding with the execution component selected at S 34 has been previously linked to other data packets corresponding with execution loads.

In some embodiments, certain data packets corresponding with execution loads may be precluded from selection based on the identity of the execution component selected in the operation S 34. For example, if a particular unlinked data packet corresponding with an execution load has been previously selected for potential linking to the data packet corresponding with the execution component selected at S 34, a repeat selection of the particular data unlinked packet corresponding with an execution load may be precluded. This may be accomplished, for example, by maintaining a list of failed linkings for each data packet corresponding with an execution component. As part of the selection process, the computer system may reference the maintained list for the data packet corresponding with the execution component selected in the operation S 34, and exclude any data packet corresponding with an execution load on the list from selection.

At S 38, the computer system determines whether the data packet corresponding with the execution load selected at S 36 may be linked to the data packet corresponding with the execution component selected at S 34. To do this, the computer system accesses the list of eligible data packets corresponding with execution components generated in the operation S 20 for the data packet corresponding with the execution load selected at S 36. If the data packet corresponding with the execution component selected at S 34 does not appear on the list of eligible data packets corresponding with execution components for the data packet corresponding with the execution load selected at S 36, the data packet corresponding with the execution load selected at S 36 may not be linked to the data packet corresponding with the execution component selected at S 34. In response, the computer returns to S 34, where a next candidate data packet corresponding with an execution component is selected.

In some embodiments, the computer system determines that the data packet corresponding with the execution load selected at S 36 may not be linked to the data packet corresponding with the execution component selected at S 34 based on other factors, not described herein. If, for any reason, the computer system determines that the data packet corresponding with the execution load selected at S 36 may not be linked to the data packet corresponding with the execution component selected at S 34, the computer system may include the data packet corresponding with the execution load selected at S 36 in the list of failed linkings for the data packet corresponding with the execution component selected at S 34.

If, however, the data packet corresponding with the execution component selected at S 34 does appear on the list of eligible data packets corresponding with execution components for the data packet corresponding with the execution load selected at S 36, the computer system determines whether the availability of the execution component of the data packet selected at S 34 may accommodate the execution load of the data packet selected at S 36. If the availability of the execution component corresponding with the data packet selected at S 34 does not accommodate the execution load of the data packet selected at S 36, the data packet corresponding with the execution load selected at S 36 may not be linked to the data packet corresponding with the execution component selected at S 34. In response, the computer system returns to S 34, and a next data packet corresponding with an execution component is selected.

If, however, the availability of the execution component corresponding with the data packet selected at S 34 does accommodate the execution load of the data packet selected at S 36, the computer system links the data packet corresponding with the execution load selected at S 36 to the data packet corresponding with the execution component selected at S 34. The computer then modifies the sequence of the execution component corresponding with the data packet selected at S 34 to include the execution load of the newly linked data packets. The modification is made according to execution load attributes of the execution load of the newly link data packets. After the data packet corresponding with the execution load selected at S 36 is linked to the data packet corresponding with the execution component selected at S 34, the computer returns to S 34 for selection of a next data packet corresponding with an execution component to consider for linking.

At the conclusion of the operation S 30, each of the data packet corresponding with the execution components will have been considered for linking with the data packets corresponding with the execution loads, and each of the data packets corresponding with execution loads will have been considered for linking with the data packets corresponding with the execution components. However, the sequence of execution loads linked to each execution component may have been determined based on the order in which the execution loads were linked. This sequence may not be optimal.

At S 40, the execution load sequence for each of the execution components is optimized. Various optimization routines may be used. In some embodiments, the physical locations of the execution loads for an execution component are used as a basis for optimizing the execution load sequence of the execution component. For example, the execution load located nearest the execution component or at the next previous execution load in the execution sequence of the execution component may be included as the next execution load to be performed in the execution load sequence of the execution component. In some embodiments, selection of a next execution load to be performed is based at least in part on a geometric analysis of a representation of the physical locations. For each candidate next execution load, an angle may be determined, where the determined angle is formed between first and second line segments in the representation. The first line segment connects the current execution load and the next previous execution load, and the second line segment connects the current execution load and the candidate next execution load. Candidate next execution loads having angles nearest 180° may be preferred in the selection process, for example by selecting the candidate next execution load having the angle nearest 180° or by weighting the angle with other selection factors. In some embodiments, candidate next execution loads having angles nearest 0° may be preferred in the selection process.

Once the execution load sequence for the execution components has been optimized, the sequence of one or more of the execution components may have been optimized such that it could accommodate one or more additional execution loads. Accordingly, in some embodiments, S 10 through S 40 may be repeated one or more times to include additional execution loads to the sequences of the execution components. The execution load sequence for each of the execution components are then communicated to the corresponding execution components.

Figure 4:
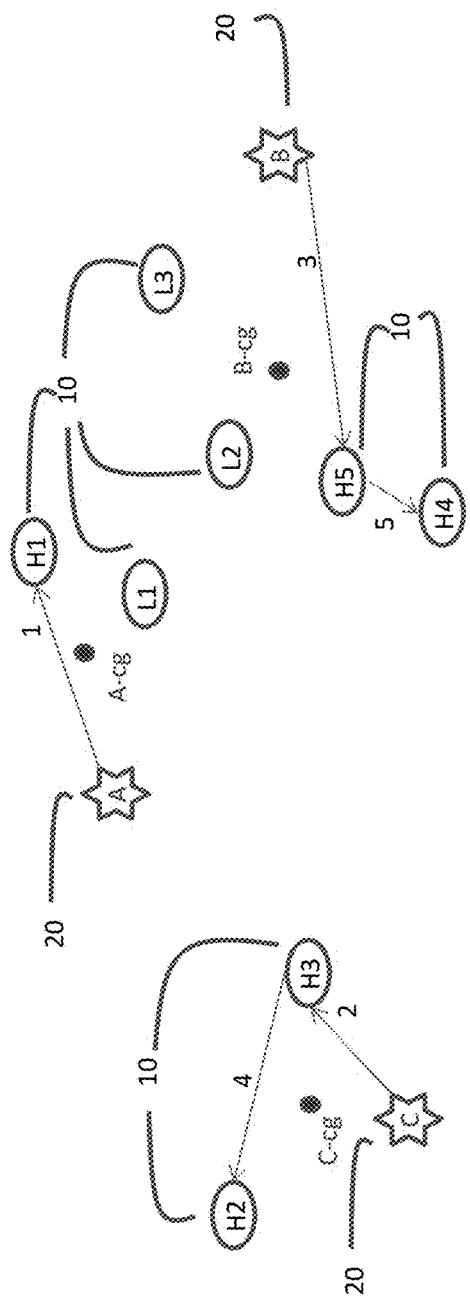
FIG. 4 is a graphical illustration of an execution component/execution load linking job.

FIG. 4 includes a graphical illustration of an execution component/execution load linking job, and includes a table of operations executed by the computer system in performing the method of FIG. 3 to determine a solution. The job illustrated in FIG. 4 includes execution components 20 and execution loads 10. Each of the execution loads 10 is designated with a priority ranking of "H" (high) or "L" (low). In addition, each of the execution loads 10 is designated with an execution load number for identification, where the execution load number is appended to the designated ranking, as shown in FIG. 4. The table of FIG. 4 illustrates the activity at each occurrence of S 38 as a computer system performs the method represented by the structured flow diagram of FIG. 3. The operations of S 38 are performed iteratively, each occurrence after another. In each occurrence of S 38, the computer determines whether the data packet corresponding with the execution load previously selected at S 36 may be linked to the data packet corresponding with the execution component previously selected at S 34, and links the data packet corresponding with the execution load selected at S 36 with the data packet corresponding with the execution component selected at S 34 if appropriate. The computer system otherwise processes the next data packet corresponding with the execution component selected at S 34.

Prior to the first occurrence (i.e., first iteration) of the operation S 38, the computer system selects a data packet corresponding with execution component A, and a data packet corresponding with execution load H1, in operations S 34 and S 36, respectively. In the first occurrence of the operation S 38, represented by the data in the table for the row marked "Round 1", the computer system determines that the data packet corresponding with execution load H1 may be linked to the data packet corresponding with execution component A based on, for example, the execution load H1 being less than a maximum distance from the physical location of the data packet corresponding with execution component A. As a result, the computer system links the data packet corresponding with execution load H1 to the data packet corresponding with execution component A.

The computer then repeats the operations S 34 and S 36, selecting the data packet corresponding with execution component C and the data packet corresponding with execution load H3. In the second occurrence of the operation S 38, represented by the data in the FIG. 4 table for the row marked "Round 2", the computer system determines that the data packet corresponding with execution load H3 may be linked to data packet corresponding with execution component C. Therefore, the computer system links the data packet corresponding with execution load H3 to the data packet corresponding with execution component C.

The computer system again repeats the operations S 34 and S 36, selecting the data packet corresponding with execution component B and the data packet corresponding with execution load H5. In the third occurrence of the operation S 38, the computer determines that the data packet corresponding with execution load H5 may be linked to the data packet corresponding with execution component B, represented by the data for the row marked "Round 3". In response, the computer system links the data packet corresponding with execution load H5 to the data packet corresponding with execution component B.

The computer system then repeats the operations S 34 and S 36, selecting the data packet corresponding with execution component A and the data packet corresponding with execution load H2. In the fourth occurrence of S 38, represented by the data for the row marked "Round 4", the computer determines that the data packet corresponding with execution load H2 may not be linked to the data packet corresponding with execution component A based on, for example, execution load H2 being located greater than a maximum distance from the physical location of the previous execution load of execution component A (execution load H1).

In response to the data packet corresponding with execution load H2 not being linkable to the data packet corresponding with execution component A, the computer system does not link the data packet corresponding with execution load H2 to the data packet corresponding with execution component A. Instead, the computer system records the failed linkage attempt, and repeats the operations S 34 and S 36, selecting the data packet corresponding with execution component B and the data packet corresponding with execution load H4. In the fifth occurrence of the operation S 38, represented by the data for the row marked "Round 5", the computer system determines that the data packet corresponding with execution load H4 may be linked to the data packet corresponding with execution component B. Accordingly, the computer system links the data packet corresponding with execution load H4 to the data packet corresponding with execution component B.

The computer system then repeats operations S 34 and S 36, selecting the data packet corresponding with execution component C and the data packet corresponding with execution load H2. In the sixth occurrence of the operation S 38, represented by the data for the row marked "Round 5", the computer determines that the data packet corresponding with execution load H2 may be linked to the data packet corresponding with execution component C. In response, the computer system links the data packet corresponding with execution load H2 to the data packet corresponding with execution component C.

Figure 5:
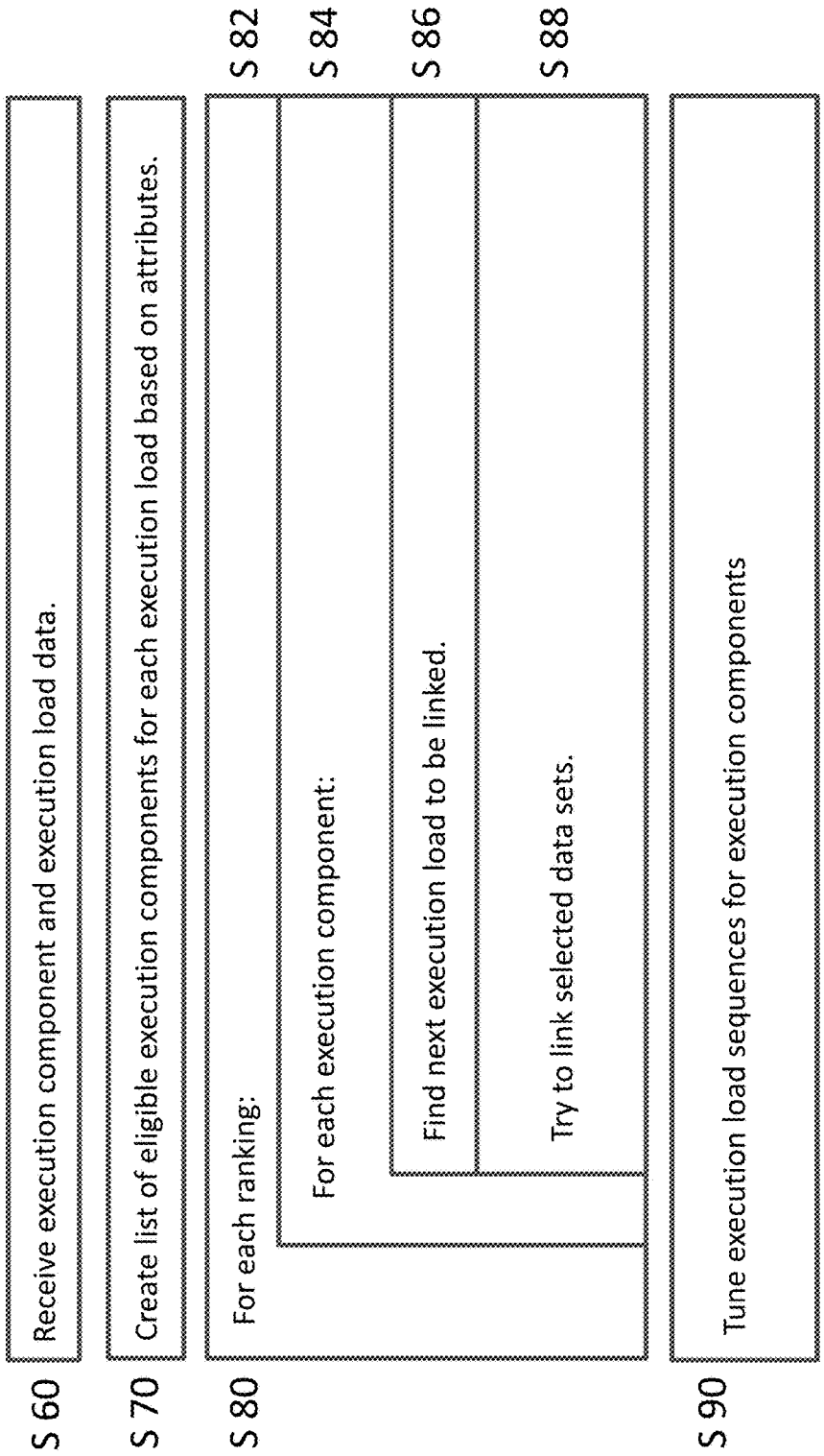
FIG. 5 is a structured flowchart diagram illustrating an embodiment of a method of generating links between sets of data packets corresponding with execution loads and sets of data packets corresponding with execution components.

FIG. 5 is a structured flowchart diagram illustrating a method performed by a computer system to generate links between sets of data packets corresponding with execution loads and sets of data packets corresponding with execution components as described herein.

In the operation S 60, the computer system receives data packets corresponding with execution loads and data packets corresponding with execution components. The data packets may include data representing the physical locations associated with each of the execution loads and with each of the execution components. The data packets may also include data representing execution component attributes and execution load attributes. In some embodiments, the data packets are tested by the computer to ensure validity and usability of the data packets before further proceeding. t At S 70, the computer system generates a list of eligible data packets corresponding with execution components for each data packet corresponding with an execution load. For example, each data packet corresponding with an execution load may have predetermined requirements as defined by its execution load attributes. In addition, based on the execution component attributes, each data packet corresponding with an execution component has predetermined qualifications that may qualify or disqualify the corresponding execution component from performing the corresponding execution load. At S 70, for each data packet corresponding with an execution load, the computer system generates a list of eligible data packets corresponding with execution components based on the corresponding execution load attributes and the corresponding execution component attributes. As a result, for each data packet corresponding with an execution load, a list of data packets corresponding with eligible qualified execution components is generated.

In some embodiments, a metric called a "center of gravity" is determined for each of the execution components. The center of gravity metric may be based on, for example, the physical location of the execution component and all execution loads within a specified distance of the physical location of the execution component. In some embodiments, the center of gravity is determined based at least in part on the physical locations of a specified quantity of execution loads. For example, the center of gravity may be based on the ten execution loads nearest a physical location of the execution component, such as the ten execution loads nearest the execution component. The center of gravity may be determined, for example, as a geometric mean of the physical locations on which the metric is based. The center of gravity may be determined in other ways, and using other sets of data.

S 80 is an iterative loop of operations, by which the computer system generates links between the data packets corresponding with the execution loads and the data packets corresponding with the execution components based in part on the lists of eligible execution components generated in operation S 70.

To do this, at S 82, the computer system determines a set of data packets corresponding with the execution loads having the highest ranking and continuing through each next highest ranking. For example, at a first occurrence of S 82, the computer system uses data packets corresponding with the execution loads having the highest ranking, and at subsequent occurrences of S 82, iteratively changes the ranking used towards levels of less ranking as links between the data packets corresponding with the execution loads and the data packets corresponding with the execution components are generated. Initially, the computer may select all of the un-linked data packets corresponding with execution loads having the highest ranking in a particular iteration, for inclusion in the set of data packets corresponding with execution loads to be linked to execution components. As a result, data packets corresponding with execution loads are linked to data packets corresponding with execution components in order of ranking of the data packets corresponding with the execution loads, starting with the highest and proceeding to the lowest. For each set of data packets corresponding with execution loads determined at S 82, the computer system performs S 84, S 86, and S 88, as described further below. Once the computer system has performed S 84, S 86, and S 88 for each of the sets of data packets corresponding with execution loads determined at S 82, the computer system performs the operation S 90 described below.

At S 84, the computer selects a next data packet corresponding with an execution component as a candidate for linking to one of the data packets corresponding with the execution loads. For example, the computer may select a data packet corresponding with an execution component having a greatest availability. Other methods of selecting a next data packet corresponding with an execution component may be used. After a next data packet corresponding with an execution component is selected, the computer system proceeds to S 86.

At S 86, from the set of data packets corresponding with execution loads determined at S 82, in some embodiments, the computer system modifies the set determined at S 82 such that the modified set includes only those data packets corresponding with execution loads which may be linked to the data packets corresponding with execution components selected in the operation S 84.

To do this, the computer selects one of the as yet un-linked data packets corresponding with execution loads of the set determined at S 32. In some embodiments, the selection of the un-linked data packets corresponding with execution loads of the set is arbitrary. In such cases, the selection may be done, for example, in numeric order, alphabetically, or according to another execution load attribute.

In some embodiments, the selection is performed according to other selection criteria. For example, the computer system may select the un-linked data packet corresponding with an execution loads of the set having a physical location which is nearest the physical location of the data packet corresponding with the execution load most recently linked to the data packet corresponding with the execution component selected at S 84.

In some embodiments, the computer system selects the data packet corresponding with an execution load of the set which has a physical location nearest the center of gravity of the data packet corresponding with the execution component selected at S 84. In some embodiments, the computer system selects the data packet corresponding with an execution load of the set which has a physical location nearest the center of gravity of the data packet corresponding with the execution component selected at S 84 if the data packet corresponding with the execution component selected at S 84 has not been previously linked to other data packets corresponding with execution loads. In some embodiments, the computer system selects the data packet corresponding with the execution load of the set which has a physical location nearest the physical location of the data packet corresponding with the execution load most recently linked to the data packet corresponding with the execution component selected at S 84 if the data packet corresponding with the execution component selected at S 84 has been previously linked to other data packets corresponding with execution loads.

In some embodiments, certain data packets corresponding with execution loads may be precluded from selection based on the identity of the execution component selected in the operation S 84. For example, if a particular unlinked data packet corresponding with an execution load has been previously selected for potential linking to the data packet corresponding with the execution component selected at S 84, a repeat selection of the particular data unlinked packet corresponding with an execution load may be precluded. This may be accomplished, for example, by maintaining a list of failed linkings for each data packet corresponding with an execution component. As part of the selection process, the computer system may reference the maintained list for the data packet corresponding with the execution component selected in the operation S 84, and exclude any data packet corresponding with an execution load on the list from selection.

At S 88, the computer system determines whether the data packet corresponding with the execution load selected at S 86 may be linked to the data packet corresponding with the execution component selected at S 84. To do this, the computer system accesses the list of eligible data packets corresponding with execution components generated in the operation S 70 for the data packet corresponding with the execution load selected at S 86. If the data packet corresponding with the execution component selected at S 84 does not appear on the list of eligible data packets corresponding with execution components for the data packet corresponding with the execution load selected at S 86, the data packet corresponding with the execution load selected at S 86 may not be linked to the data packet corresponding with the execution component selected at S 84. In response, the computer returns to S 84, where a next candidate data packet corresponding with an execution component is selected.

In some embodiments, the computer system determines that the data packet corresponding with the execution load selected at S 86 may not be linked to the data packet corresponding with the execution component selected at S 84 based on other factors, not described herein. If, for any reason, the computer system determines that the data packet corresponding with the execution load selected at S 86 may not be linked to the data packet corresponding with the execution component selected at S 84, the computer system may include the data packet corresponding with the execution load selected at S 86 in the list of failed linkings for the data packet corresponding with the execution component selected at S 84.

If, however, the data packet corresponding with the execution component selected at S 84 does appear on the list of eligible data packets corresponding with execution components for the data packet corresponding with the execution load selected at S 86, the computer system determines whether the availability of the execution component of the data packet selected at S 84 may accommodate the execution load of the data packet selected at S 86. If the availability of the execution component corresponding with the data packet selected at S 84 does not accommodate the execution load of the data packet selected at S 86, the data packet corresponding with the execution load selected at S 86 may not be linked to the data packet corresponding with the execution component selected at S 84. In response, the computer system returns to S 84, and a next candidate data packet corresponding with an execution component is selected.

If, however, the availability of the execution component corresponding with the data packet selected at S 84 does accommodate the execution load of the data packet selected at S 86, the computer system links the data packet corresponding with the execution load selected at S 86 to the data packet corresponding with the execution component selected at S 84. The computer then modifies the sequence of the execution component corresponding with the data packet selected at S 84 to include the execution load of the newly linked data packets. The modification is made according to execution load attributes of the execution load of the newly link data packets. After the data packet corresponding with the execution load selected at S 86 is linked to the data packet corresponding with the execution component selected at S 84, the computer returns to S 86 for selection of a next data packet corresponding with an execution load to consider for linking with the data packet corresponding with the execution component selected at S 84.

At the conclusion of the operation S 80, each of the data packet corresponding with the execution components will have been considered for linking with the data packets corresponding with the execution loads, and each of the data packets corresponding with execution loads will have been considered for linking with the data packets corresponding with the execution components. However, the sequence of execution loads linked to each execution component may have been determined based on the order in which the execution loads were linked. This sequence may not be optimal.

At S 90, the execution load sequence for each of the execution components is optimized. Various optimization routines may be used. In some embodiments, the physical locations of the execution loads for an execution component are used as a basis for optimizing the execution load sequence of the execution component. For example, the execution load located nearest an execution component or at the next previous execution load in the execution sequence of the execution component may be included as the next execution load to be performed in the execution load sequence of the execution component. In some embodiments, selection of a next execution load to be performed is based at least in part on a geometric analysis of a representation of the physical locations. For each candidate next execution load, an angle may be determined, where the determined angle is formed between first and second line segments in the representation. The first line segment connects the current execution load and the next previous execution load, and the second line segment connects the current execution load and the candidate next execution load. Candidate next execution loads having angles nearest 180° may be preferred in the selection process, for example by selecting the candidate next execution load having the angle nearest 180° or by weighting the angle with other selection factors. In some embodiments, candidate next execution loads having angles nearest 0° may be preferred in the selection process.

Once the execution load sequence for the execution components has been optimized, the sequence of one or more of the execution components may have been optimized such that it could accommodate one or more additional execution loads. Accordingly, in some embodiments, S 60 through S 90 may be repeated one or more times to include additional execution loads to the sequences of the execution components. The execution load sequence for each of the execution components are then communicated to the corresponding execution components.

Figure 6:
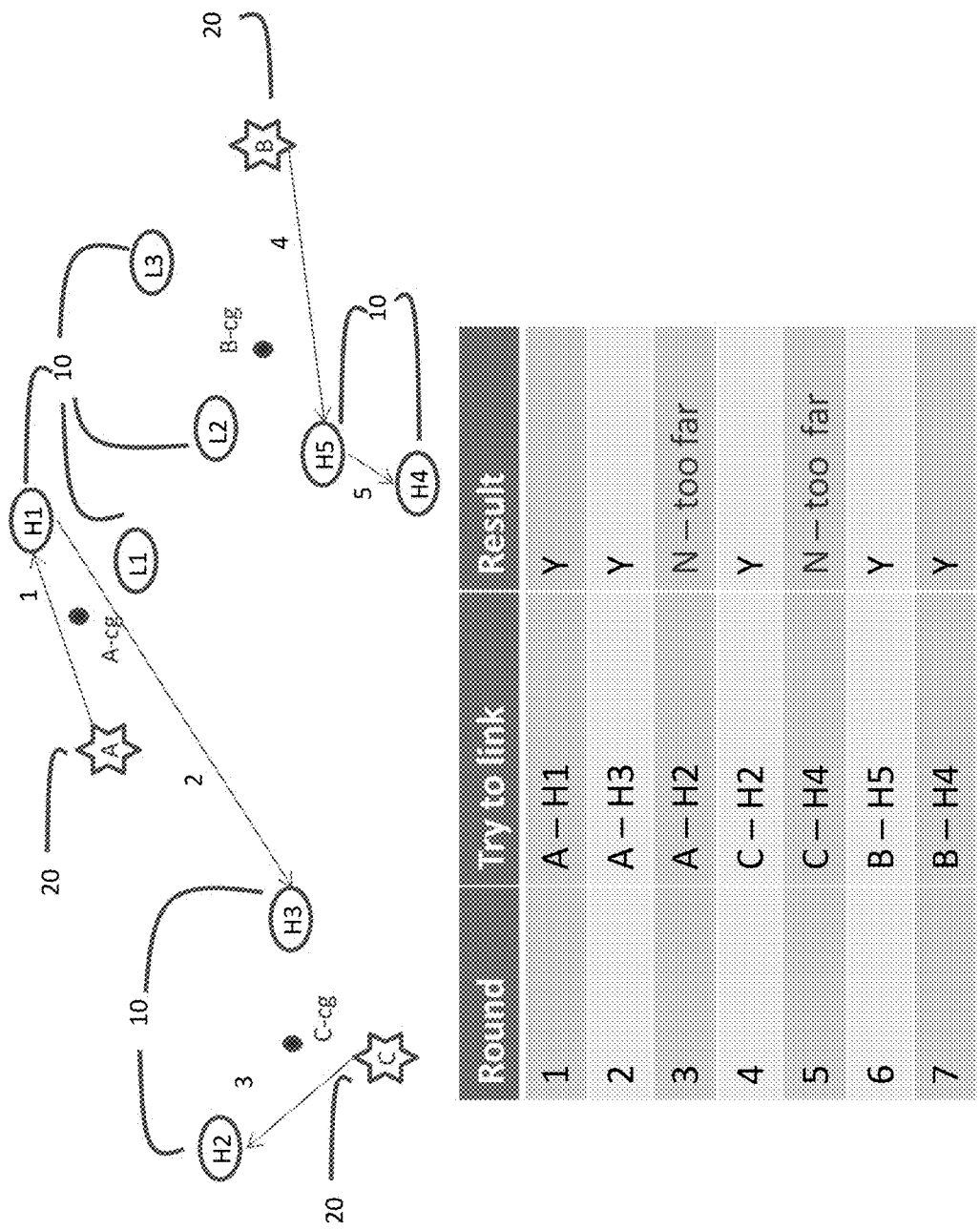
FIG. 6 is a graphical illustration of an execution component/execution load linking job.

FIG. 6 includes a graphical illustration of an execution component/execution load linking job, and includes a table of operations executed by the computer system in performing the method of FIG. 5 to determine a solution. The job illustrated in FIG. 6 includes execution components 20 and execution loads 10. Each of the execution loads 10 is designated with a priority ranking of "H" (high) or "L" (low). In addition, each of the execution loads 10 is designated with an execution load number for identification, where the execution load number is appended to the designated ranking, as shown in FIG. 4.

The table of FIG. 6 illustrates the activity at each occurrence of S 88 as a computer system performs the method represented by the structured flow diagram of FIG. 5. The operations of S 88 are performed iteratively, each occurrence after another. In each occurrence of S 88, the computer determines whether the data packet corresponding with the execution load previously selected at S 86 may be linked to the data packet corresponding with the execution component previously selected at S 84, and links the data packet corresponding with the execution load selected at S 86 with the data packet corresponding with the execution component selected at S 84 if appropriate. The computer system otherwise processes the next data packet corresponding with the execution load selected at S 86.

Prior to the first occurrence of the operation labeled S 88, the computer system selects the data packet corresponding with the execution component A, and the data packet corresponding with the execution load H1, in the operations labeled S 84 and S 86, respectively. FIG. 5 and FIG. 6 show that, in the first occurrence of S 88, the computer system determines that the data packet corresponding with the execution load H1 may be linked to the data packet corresponding with the execution component A based on, for example, the execution load H1 being closest to the center of gravity of execution component A. As a result, the computer system links the data packet corresponding with execution load H1 to the data packet corresponding with execution component A.

In response to the data packet corresponding with execution load H1 being linked to the data packet corresponding with execution component A, the computer system then repeats the operation S 86, selecting the data packet corresponding with the execution load H3. In the second occurrence of the operation S 88, the computer determines that the data packet corresponding with the execution load H3 may be linked to the data packet corresponding with the execution component A. Therefore, the computer system links the data packet corresponding with execution load H3 to the data packet corresponding with execution component A.

In response to the data packet corresponding with execution load H1 being linked to the data packet corresponding with execution component A, the computer system then repeats the operation S 86, selecting the data packet corresponding with the execution load H2. In the third occurrence of the operation S 88, the computer system determines that the data packet corresponding with the execution load H2 may not be linked to the data packet corresponding with the execution component A. Therefore, the computer system does not link the data packet corresponding with execution load H2 to the data packet corresponding with execution component A.

In response to the data packet corresponding with execution load H2 not being linkable to the data packet corresponding with execution component A, the computer then repeats the operations S 84 and S 86, selecting the data packet corresponding with execution component C and the data packet corresponding with load H2. In the fourth occurrence of the operation S 88, the computer determines that the data packet corresponding with execution load H2 may be linked to the data packet corresponding with execution component C. Therefore, the computer system links the data packet corresponding with execution load H2 to the data packet corresponding with execution component C.

In response to the data packet corresponding with execution load H2 being linked or being linkable to the data packet corresponding with execution component A, the computer then repeats the operation S 86, selecting the data packet corresponding with execution load H4. In the fifth occurrence of the operation S 88, the computer determines that the data packet corresponding with execution load H4 may not be allocated to the data packet corresponding with execution component C. Therefore, the computer system does not link the data packet corresponding with execution load H4 to the data packet corresponding with execution component C.

In response to the data packet corresponding with execution load H4 not being linkable to the data packet corresponding with execution component C, the computer then repeats the operations S 84 and S 86, selecting the data packet corresponding with execution component B and the data packet corresponding with execution load H5. In the sixth occurrence of the operation S 88, the computer determines that the execution load H2 may be allocated to Execution component B. Therefore, the computer system links the data packet corresponding with execution load H2 to the data packet corresponding with execution component B.

In response to the data packet corresponding with execution load H2 being linked or being linkable to the data packet corresponding with execution component B, the computer system then repeats S 86, selecting the data packet corresponding with execution load H4. In the seventh occurrence of the operation S 88, the computer determines that the execution load H4 may be allocated to Execution component C. Therefore, the computer system links the data packet corresponding with execution load H4 to the data packet corresponding with execution component C.

As no further data packets are to be linked, the computer system may optimize the execution load sequence for each of the execution components.

Numerous applications link data packets corresponding with execution loads with data packets corresponding with execution components, and may benefit from the embodiments discussed herein. For example, in a computer system computing assigning appraisals, links generated between data packets corresponding with execution components or appraisers and data packets corresponding with execution loads or appraisals are used and represent assignments of the execution loads to the execution components.

Figure 7:
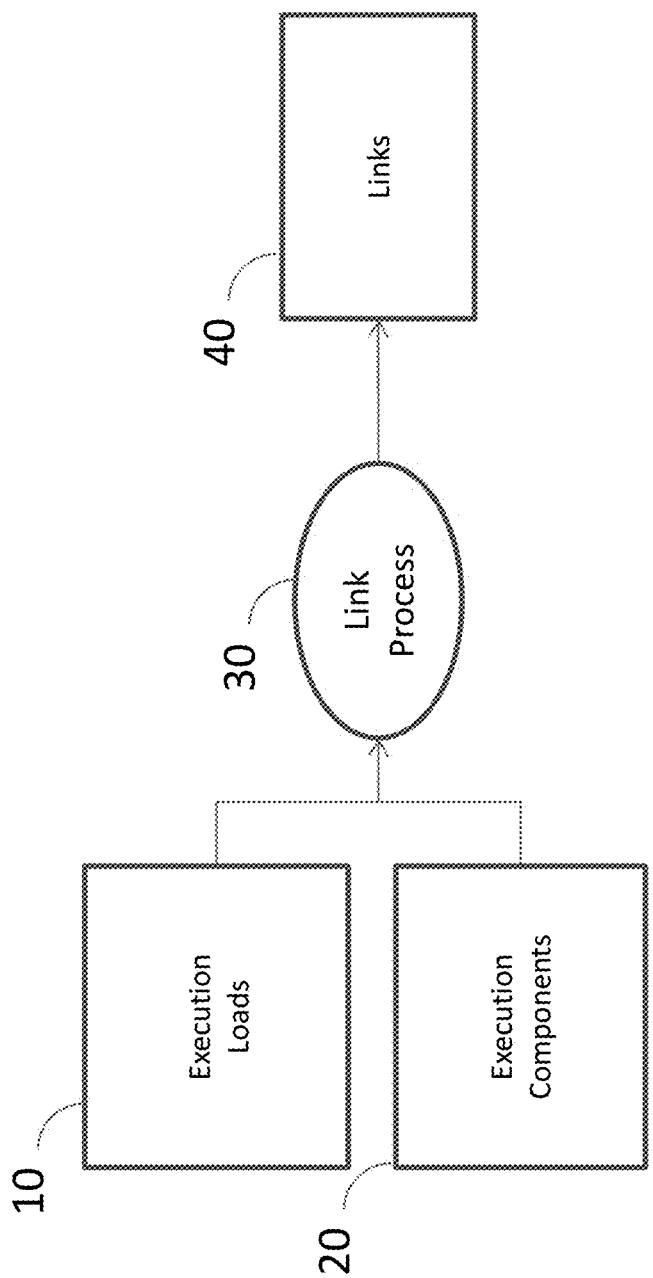
FIG. 7 is a schematic diagram of an exemplary execution load/execution component linking process.

FIG. 7 is a schematic diagram of the processes described above. Execution loads 10 and execution components 20 are inputs to execution load/execution component linking process 30. As shown, execution load/execution component linking process 30 generates a plurality of execution load/execution component links 40, where each link 40 represents a connection between an execution load and an execution component.

In some embodiments, despite the reduction in computer processing time achieved by the systems and methods discussed above as compared with that used when finding an optimal solution or other processes, further reduction in computer processing time may be desirable. For example, if the number of execution components and execution loads is sufficiently large, computer processing time may be undesirably long.

In some embodiments, a load/execution source link generation job may be conditionally split so as to form two or more smaller, separate execution load/execution component link generation jobs. Each of the two or more smaller, separate execution load/execution component link generation jobs may be processed using, for example, a method such as that described above. Other methods may be used. For example, any of the systems or methods described in U.S. patent application Ser. No. 15/616,536, filed Jun. 7, 2017 or in U.S. patent application Ser. No. 14/106,325, filed Dec. 13, 2013, which are assigned to the assignee of the current application, and which are incorporated herein by reference, may be used. In some embodiments an optimum solution is determined.

In some embodiments, the smaller, separate execution load/execution component link generation jobs are serially processed. In some embodiments, the smaller, separate execution load/execution component link generation jobs are processed in parallel. Regardless of being processed in series or in parallel, however, the computer processing time is reduced by splitting the large execution load/execution component link generation job. The reduction is achieved at least in part because the computer processing time is exponentially related to the number of execution loads and execution sources. Therefore, splitting a large execution load/execution component link generation job by two or four, reduces the computer processing time by a factor greater than two or four, respectively.

Figure 8:
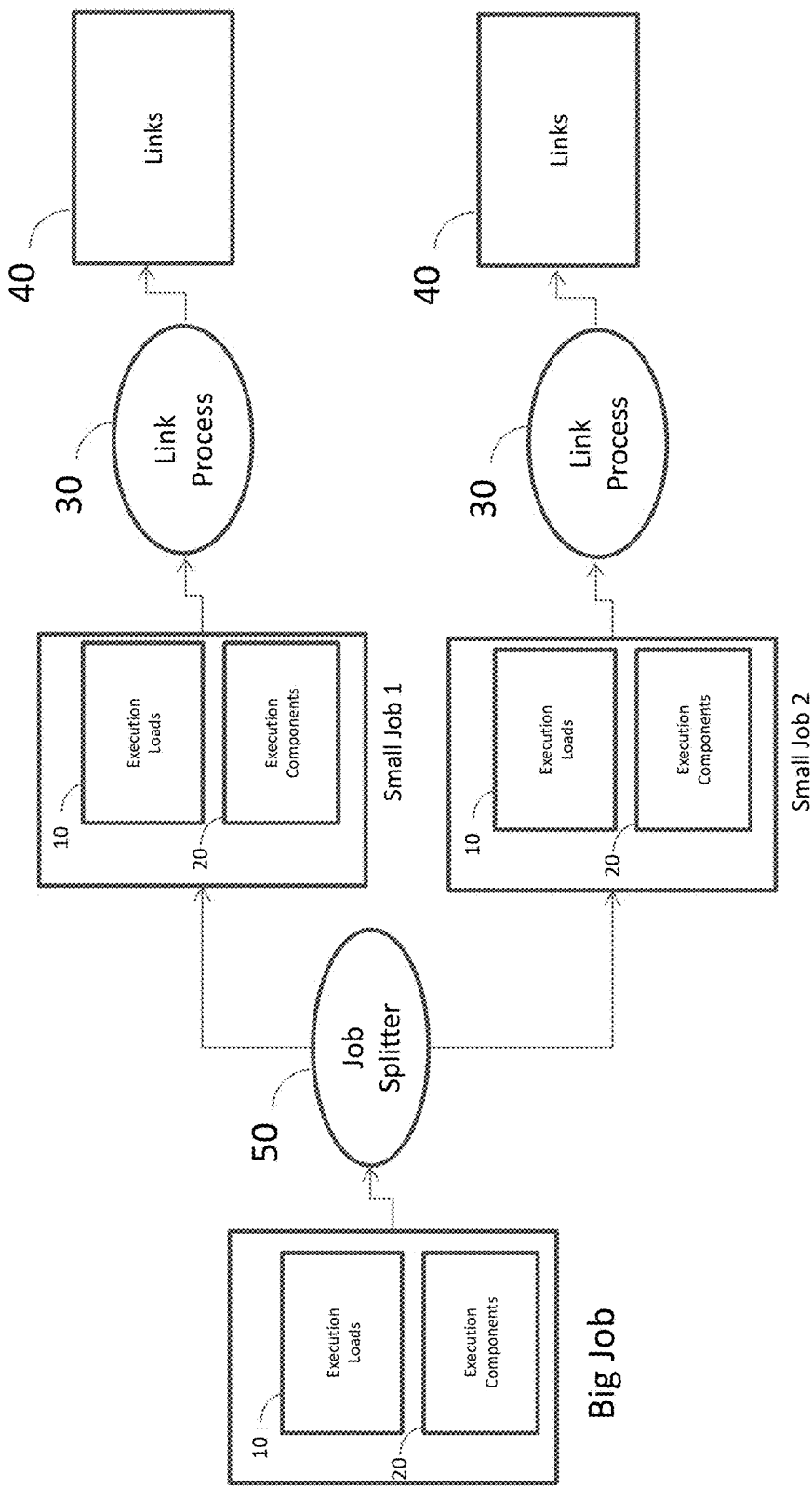
FIG. 8 is a schematic diagram of an embodiment of a process which splits a large execution load/execution component linking job into a number of smaller separate execution load/execution component linking jobs.

FIG. 8 is a schematic diagram of a process which splits a large execution load/execution component link generation job into smaller separate execution load/execution component link generation jobs. As shown, the execution loads 10 and execution components 20 associated with the big job are input to job splitter process 50. The job splitter process 50 generates two smaller jobs, a first small job 1, and a second small job 2. In addition, each of the small job 1 and small job 2 are input to execution load/execution component linking processes 30, which generate execution load/execution component links 40 for each of small job 1 and small job 2.

In some embodiments, a large execution load/execution component link generation job is split into a number of smaller separate execution load/execution component link generation jobs based solely on a weight, such as a quantity of one or more of tasks and servicers. For example, if a large execution load/execution component link generation job includes more than a predetermined number of execution loads, execution tasks, or execution loads and execution tasks, then the large execution load/execution component link generation job is split into a number of smaller separate execution load/execution component link generation jobs, such that none of the smaller separate execution load/execution component link generation jobs includes more than the predetermined number of execution loads, execution tasks, or execution loads and execution tasks.

Dividing a large execution load/execution component link generation job into a number of smaller separate execution load/execution component link generation jobs may be accomplished, for example, based on physical location, such that the physical area of the large execution load/execution component link generation job is split into a number of separate sections according to area sizes. In some embodiments, each particular section is selected to have approximately the same physical area as the other sections. That is, the area of the large execution load/execution component link generation job is split into separate sections having approximately the same area. In some embodiments, each particular section is selected to have or approximately have the same weight, number of execution loads, execution components, execution loads and execution components. In some embodiments, the area of the large execution load/execution component link generation job is split and subsplit until no section has a weight greater than a threshold. Once split, each particular section includes a number of execution loads and execution components, for the execution load/execution component link generation job of the particular section.

In some embodiments, once the smaller separate sections and jobs are defined, prior to processing the jobs, it may be preferable to combine two or more of the smaller separate execution load/execution component link generation jobs into groups. For example, prior to processing the jobs, the smaller separate execution load/execution component link generation jobs may be grouped such that the each of the groups of jobs is similar to each of the other groups, where the similarity is determined or measured by one or more metrics. For example, in some embodiments, prior to processing the jobs, the separate execution load/execution component link generation jobs are grouped such that a density of each of the groups is similar to the density of each of the other groups, where density is based on the number of execution loads of the group divided by the number of execution loads and execution components of the group. Other definitions of density may be used. For example, density may be defined as the number of execution loads of the group divided by the number of execution components of the group. In some embodiments, density may be based on a physical area of the group.

Once the smaller separate execution load/execution component link generation jobs are grouped, each of the groups may be processed using, for example, a method such as one of the techniques described herein or referenced above. Other methods may alternatively be used.

Figure 9:
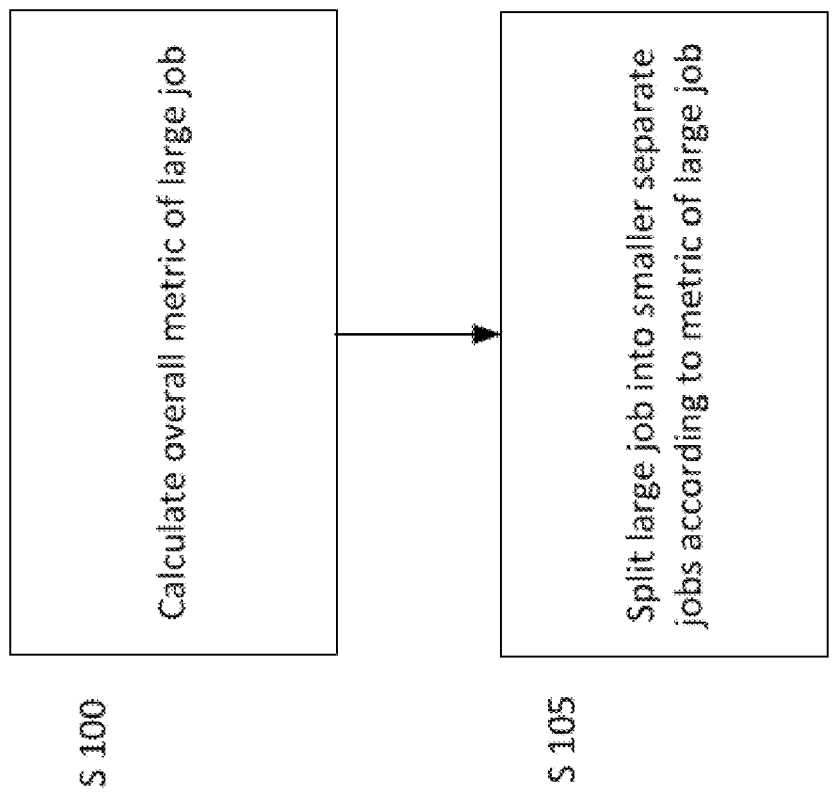
FIG. 9 is a schematic diagram of an embodiment of a process which splits a large execution load/execution component linking job into a number of smaller separate execution load/execution component linking jobs.

FIG. 9 is a flowchart diagram illustrating a process of splitting a large execution load/execution component link generation job into smaller separate execution load/execution component link generation jobs. In the first operation S 100, an overall metric is determined for the large execution load/execution component link generation job. For example, the overall metric may be a density, such as that described elsewhere herein.

In the next operation S 105, the large execution load/execution component link generation job is split into a number of smaller separate execution load/execution component link generation jobs. A metric corresponding to the metric determined in the first operation S 100 may be determined for each of the smaller separate execution load/execution component link generation jobs. In this embodiment, the large execution load/execution component link generation job is split into a number of smaller separate execution load/execution component link generation jobs such that the metric determined for each of the smaller separate execution load/execution component link generation jobs is similar to the metric determined for the large execution load/execution component link generation job. For example, the absolute value of a difference between the metrics determined for each of the smaller separate execution load/execution component link generation jobs and the metric determined for the large execution load/execution component link generation job is less than a threshold.

FIG. 10 is a structured flowchart diagram illustrating a more detailed method used by a computer system, to split a large execution load/execution component link generation job into a number of smaller separate execution load/execution component link generation jobs.

At the operation labeled S 110, predetermined fixed values are accessed by the computer system, which may, for example, include split_threshold_setting, density_tolerance_setting, and weight_threshold_setting. As discussed further below, split_threshold_setting is used to determine whether the large execution load/execution component link generation job is sufficiently large to cause performance of the splitting (grouping) technique described above. As discussed further below, weight_threshold_setting is used to determine whether smaller separate execution load/execution component link generation jobs are sufficiently large to cause further splitting of the groups. As discussed further below, density_tolerance_setting is used to determine whether groups of jobs have sufficiently similar density to proceed with the grouping technique.

At the operation labeled S 120, a determination is made as to whether the large execution load/execution component link generation job is sufficiently large to split the allocation job. To do this, in this embodiment, a weight, defined, in this embodiment, as the number of execution loads of the large execution load/execution component link generation job and execution components of the large execution load/execution component link generation job, is compared to split_threshold_setting. If the weight is less than split_threshold_setting, then the large execution load/execution component link generation job is not split. The method otherwise continues to the operation S 130, where an overall density is determined for the large execution load/execution component link generation job. In this embodiment, the overall density is determined as the number of execution loads of the large execution load/execution component link generation job divided by the number of execution loads and execution components of the large execution load/execution component link generation job.

At the operation S 140, a recursive procedure, which generates a job tree, is called by the computer for execution. In the procedure call, the large execution load/execution component link generation job is passed to the recursive procedure for splitting.

At the operation S 150, the recursive procedure is performed using the job passed thereto. In the recursive procedure, the large job is split into a predetermined number of smaller jobs, as noted above. For example, the large job may be split into four smaller separate jobs. In some embodiments, the job may be split into two, three, five, or other number of smaller separate jobs.

In some embodiments, the number of smaller separate jobs into which the large job is split is not predetermined, but may be dynamic. For example, the number of smaller separate jobs into which the large job is to be split may be determined based on a metric indicating a size of the large job and a limit metric indicating a desired size of the number of smaller separate jobs after splitting the large job.

Each of the smaller separate jobs is based on a distinct portion of the split large job. The operation S 152, which includes the operations S 154, S 156, and S 158, is performed for the portions associated with each of the smaller jobs. At the operation S 152, a new, smaller job associated with the current portion for which the operation S 152 is being performed is created and tested to determine whether the new, smaller job should be further split.

At the operation S 154, a new smaller job associated with the current portion for which the operation S 152 is being performed is generated. In addition, the execution loads and execution components of the current portion are associated with the new smaller job. Furthermore, the new smaller job is given an identification. In some embodiments, the identification includes information indicating the new smaller job as being a child of the larger job being split.

At the operation S 156, a weight for the new smaller job is determined. For example, the weight for the new smaller job may be the number of execution loads of the new smaller job and the number of execution components of the new smaller job.

At the operation S 158, if the determined weight of the new smaller job is greater than weight_threshold_setting, then the recursive procedure is called by the computer. In the recursive procedure call, the new smaller job is passed to the procedure for splitting.

Following the operation S 158, the operation S 152 is repeated for all of the new smaller jobs generated in the recursive procedure executed by the computer system. Once completed, the recursive procedure has split the large execution load/execution component link generation job into a number of new smaller separate jobs. In addition, the procedure has given each of the new smaller jobs an identity, for example, indicating a parent job for each of the new smaller jobs.

At the operation S 160, an ordered list of the new smaller jobs created by the recursive procedure is generated. The sequential order of the list assures that jobs sequentially adjacent in the list are associated with portions of the large load/execution source link generation job that are physically adjacent.

At the operation S 170, a list of job groups is generated by the computer system. To generate the list, the new smaller jobs created by the recursive procedure are grouped such that a density of each of the groups is similar to the density of each of the other groups, where density is defined as the number of execution loads of the group divided by the number of execution loads and execution components of the group.

Prior to execution of the while loop of the operation S 170, data structures stored and maintained by the computer system called GroupList, JobGroup, and NextJob are initialized. The GroupList, which includes the list of job groups to be generated, is created. In addition, the JobGroup, which includes a group of jobs, is created and added to the GroupList. Furthermore, the NextJob is defined as the first job in the ordered list of jobs generated in the operation S 160.

In the while loop of the operation S 170, the execution loads, the execution components, and the physical area of NextJob are associated with JobGroup. In addition, a density for JobGroup is determined, where the density is determined as the number of execution loads of JobGroup divided by the number of execution loads and execution components of JobGroup.

Once the density is determined, a determination is made to either close the JobGroup data structure or to include another job to the JobGroup. The computer makes the determination based on the density of the JobGroup.

If the computer determines that the overall density determined in the operation S 130 minus density_tolerance_setting is greater than the density of JobGroup, or if the density of JobGroup is greater than the overall density determined in the operation S 130 and density_tolerance_setting, the density of the JobGroup is inadequate and the JobGroup is not closed. The ordered list of jobs generated in the operation S 160 is then accessed to define a new NextJob, and the computer performs the while loop with the new NextJob, and the same JobGroup.

If the computer determines that the overall density determined in the operation S 130 minus density_tolerance_setting is less than the density of JobGroup and the density of JobGroup is less than the overall density determined in the operation S 130 and density_tolerance_setting, then the density of the JobGroup is adequate and JobGroup is closed by creating a new JobGroup and adding the new JobGroup to the GroupList. The ordered list of jobs generated in the operation S 160 is then accessed to define a new NextJob, and the computer performs the while loop with the new NextJob, the new JobGroup, and the modified GroupList.

The operation S 170 concludes when all of the jobs of the ordered list of the operation S 160 have been included in one of the groups of the list of groups. Once the list of groups has been generated, each of the groups represents an execution load/execution component link generation job to be processed.

Figure 11:
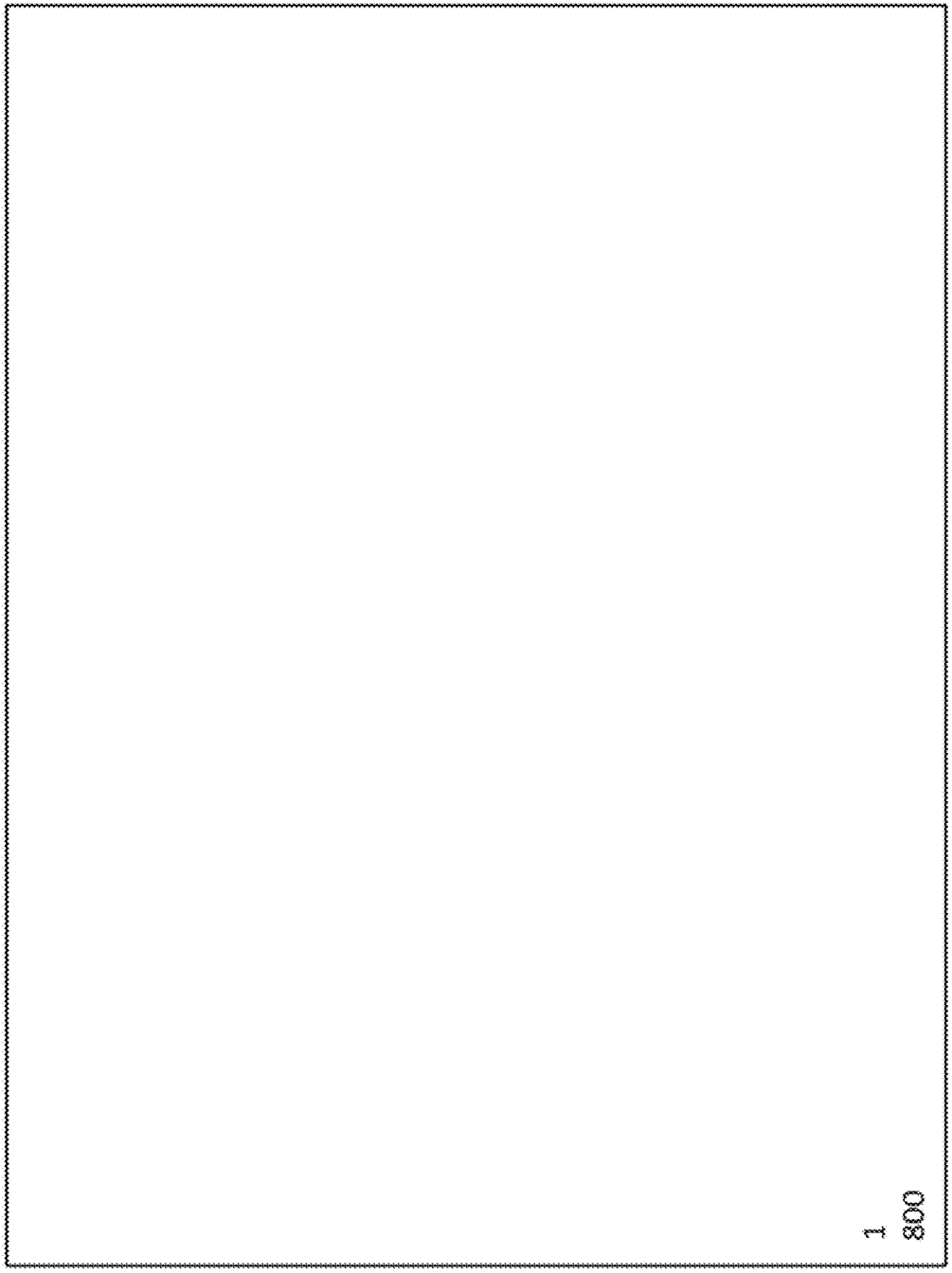
FIG. 11 illustrates an example of an execution load/execution component linking job which may be split.

FIG. 11 illustrates an example of an execution load/execution component link generation job which may be split. In FIG. 11, a physical area 1 has a number of execution loads for a number of execution components. In this example, the total number of execution components is 200 and the total number of execution loads is 600, and, as shown in the physical area 1, the total number of execution loads and execution components is 800. The method illustrated in FIG. 10 may be used to conditionally split the execution load/execution component link generation job into a number of smaller separate execution load/execution component link generation jobs.

In this example, split_threshold_setting, which the computer uses to determine whether the large execution load/execution component link generation job is large enough to cause performance of the splitting method, is 500. In addition, weight_threshold_setting, which the computer uses to determine whether smaller separate execution load/execution component link generation jobs are large enough to cause further splitting, is 175. Furthermore, density_tolerance_setting, which the computer uses to determine whether groups of jobs have sufficiently similar density, is 5%. At the operation S 110, split_threshold_setting, density_tolerance_setting, and weight_threshold_settings are accessed by the computer system.

At the operation S 120, the computer system determines whether the large execution load/execution component link generation job is large enough for splitting. To do this, the computer compares the number of execution loads and execution components in the physical area 1 (800) to split_threshold_setting (500). In this example, because the number of execution loads and execution components in the physical area 1 (800) is greater than split_threshold_setting (500), the execution load/execution component link generation job of the physical area 1 is split. Accordingly, at the operation S 130, the computer system determines an overall density number for the physical area 1. In this example, the overall density is the number of execution loads (600) divided by the number of execution loads (600) and the number of execution components (200), or 0.75.

At the operation S 140, the computer system calls a recursive procedure, which generates a job tree. In the procedure call, the job of the physical area 1 is passed to the procedure for splitting.

At the operation S 150, the procedure is performed on the physical area 1. In the procedure, the area 1 is split into four smaller areas, each having a smaller job. The operation S 152, which includes the operations S 154, S 156, and S 158, is performed by the computer for each of the portions associated with the smaller jobs.

Figure 12:
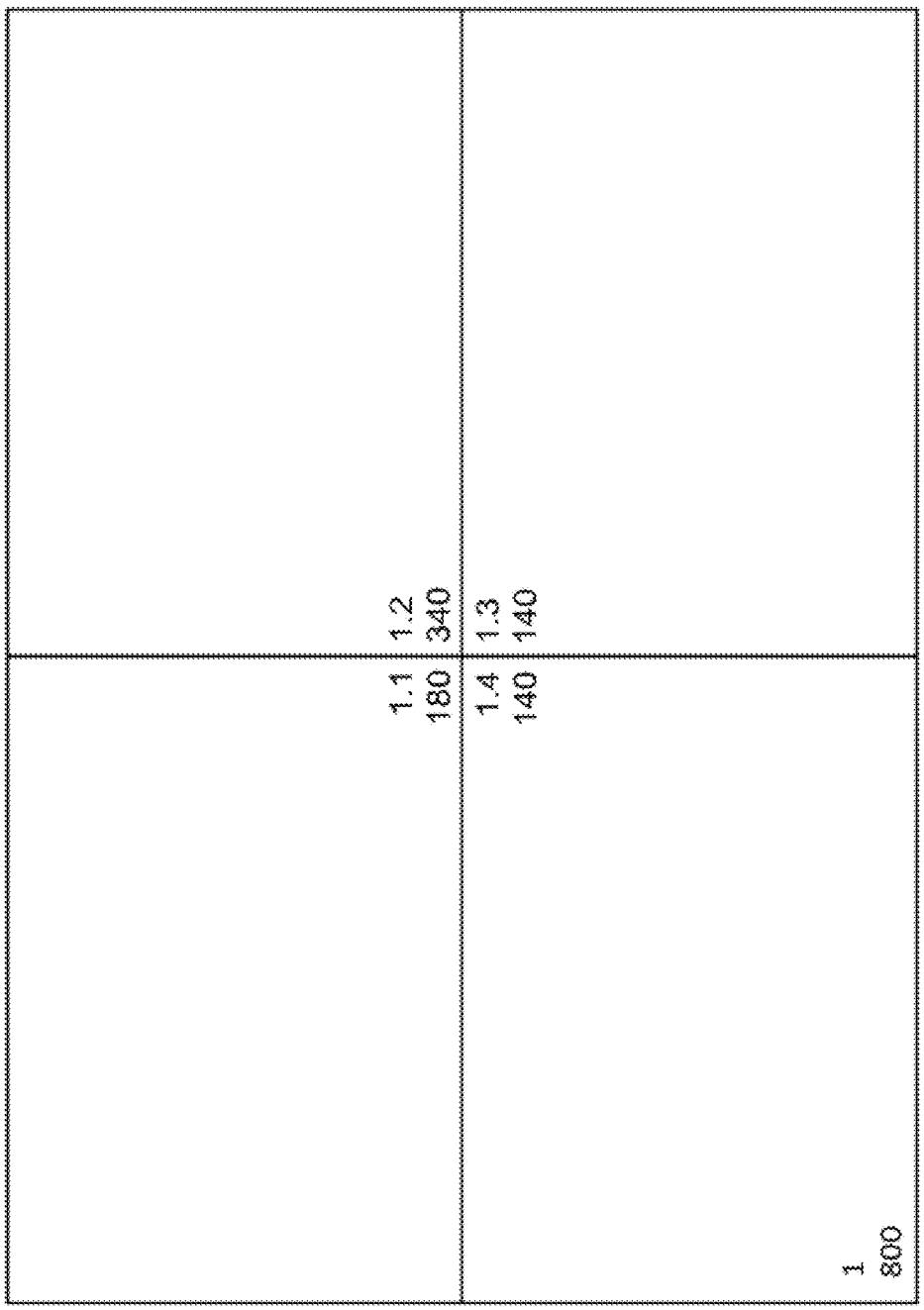
FIG. 12 illustrates a subsplit job of FIG. 11.

At the operation S 154, the area 1.1 is defined to be the upper left quadrant of area 1. As shown in FIG. 12, area 1.1, labeled in its lower right corner, has 130 execution loads and 50 execution components.

At the operation S 156, a weight for the area 1.1 is determined by the computer system. In this example, the weight for the area 1.1 is the number of execution loads and execution components of the area 1.1, or 180.

At the operation S 158, because the determined weight of the area 1.1 is not greater than weight_threshold_setting, which is 180, the recursive procedure is not called, and the computer repeats the operation S 152 for the next area, which is area 1.2.

At the operation S 154, the area 1.2 is defined to be the upper right quadrant of area 1. As shown in FIG. 12, the area 1.2, labeled in its lower left corner, has 292 execution loads and 48 execution components.

At the operation S 156, a weight for the area 1.2 is determined by the computer system. In this example, the weight for the area 1.2 is the number of execution loads and execution components of the area 1.2, or 340.

At the operation S 158, because the determined weight of the area 1.2 is greater than weight_threshold_setting, 180, the computer calls the recursive procedure. In the execution of the procedure call, the job of the area 1.2 is passed to the procedure for splitting.

At the operation S 150, the procedure is performed on the physical area 1.2. In the procedure, the area 1.2 is split into four smaller areas, each having a smaller allocation job. The operation S 152, which includes the operations S 154, S 156, and S 158, is performed by the computer for each of the distinct portions associated with the smaller jobs.

At the operation S 154, the area 1.2.1 is defined to be the upper left quadrant of the area 1.2. As shown in FIG. 13, the area 1.2.1, labeled in its lower right corner, has 63 execution loads and 12 Execution components.

At the operation S 156, a weight for the area 1.2.1 is determined by the computer system. In this example, the weight for the area 1.2.1 is the number of execution loads and execution components of the area 1.2.1, or 75.

At the operation S 158, because the determined weight of the area 1.2.1 is not greater than weight_threshold_setting, which is 180, the recursive procedure is not called, and the computer repeats the operation S 152 for the next area, which is area 1.2.2.

At the operation S 154, the area 1.2.2 is defined to be the upper right quadrant of area 1.2. As shown in FIG. 13, the area 1.2.2, labeled in its lower left corner, has 23 execution loads and 12 execution components.

At the operation S 156, a weight for the area 1.2.2 is determined by the computer. In this example, the weight for the area 1.2.2 is the number of execution loads and execution components of the area 1.2.2, or 35.

At the operation S 158, because the determined weight of the area 1.2.2 is not greater than weight_threshold_setting, which is 180, the recursive procedure is not called, and the computer repeats the operation S 152 for the next area, which is the area 1.2.3.

At the operation S 154, the area 1.2.3 is defined to be the lower right quadrant of the area 1.2. As shown in FIG. 13, the area 1.2.3, labeled in its upper left corner, has 173 execution loads and 12 execution components.

At the operation S 156, a weight for the area 1.2.3 is determined by the computer. In this example, the weight for the area 1.2.3 is the number of execution loads and execution components of the area 1.2.3, or 185.

At the operation S 158, because the determined weight of the area 1.2.3 is greater than weight_threshold_setting, 180, the recursive procedure is called. In the call, the job of the area 1.2.3 is passed to the procedure for splitting.

At the operation S 150, the procedure is performed on the physical area 1.2.3. In the procedure, the area 1.2.3 is split into four smaller areas, each having a smaller allocation job. The operation S 152, which includes the operations S 154, S 156, and S 158, is performed by the computer for each of the distinct portions associated with the smaller jobs.

At the operation S 154, the area 1.2.3.1 is defined to be the upper left quadrant of area 1.2.3. As shown in FIG. 14, the area 1.2.3.1, labeled in its lower right corner, has 13 execution loads and 3 execution components.

At the operation S 156, a weight for the area 1.2.3.1 is determined by the computer. In this example, the weight for the area 1.2.3.1 is the number of execution loads and execution components of the area 1.2.3.3, or 16.

At the operation S 158, because the determined weight of the area 1.2.3.1 is not greater than weight_threshold_setting, which is 180, the recursive procedure is not called, and the computer repeats the operation S 152 for the next area, which is the area 1.2.3.2.

At the operation S 154, the area 1.2.3.2 is defined to be the upper right quadrant of the area 1.2.3. As shown in FIG. 14, the area 1.2.3.2, labeled in its lower left corner, has 9 execution loads and 2 execution components.

At the operation S 156, a weight for the area 1.2.3.2 is determined by the computer. In this example, the weight for the area 1.2.3.2 is the number of execution loads and execution components of the area 1.2.3.2, or 12.

At the operation S 158, because the determined weight of the area 1.2.3.2 is less than weight_threshold_setting, 180, the recursive procedure is not called, and The operation S 152 is repeated for the next area, the area 1.2.3.3.

At the operation S 154, the area 1.2.3.3 is defined to be the lower right quadrant of the area 1.2.3. As shown in FIG. 14, the area 1.2.3.3, labeled in its upper left corner, has 9 execution loads and 4 execution components.

At the operation S 156, a weight for the area 1.2.3.3 is determined by the computer. In this example, the weight for the area 1.2.3.3 is the number of execution loads and execution components of the area 1.2.3.3, or 13.

At the operation S 158, because the determined weight of the area 1.2.3.3 is less than weight_threshold_setting, 180, the recursive procedure is not called, and the operation S 152 is repeated for the next area, the area 1.2.3.4.

At the operation S 154, the area 1.2.3.4 is defined to be the lower left quadrant of area 1.2.3. As shown in FIG. 14, area 1.2.3.4, labeled in its upper right corner, has 141 execution loads and 3 execution components. The areas 1.2.3.1, 1.2.3.2, 1.2.3.3, and 1.2.3.4 are defined so that the area 1.2.3.1 is adjacent the area 1.2.2, and the area 1.2.3.4 is adjacent to the area of the area 1.2.

At the operation S 156, a weight for the area 1.2.3.4 is determined by the computer. In this example, the weight for the area 1.2.3.4 is the number of execution loads and execution components of the area 1.2.3.4, or 144.

At the operation S 158, because the determined weight of the area 1.2.3.4 is less than weight_threshold_setting, 180, the recursive procedure is not called, and The operation S 152 is repeated for the next area, the area 1.2.4

At the operation S 154, the area 1.2.4 is defined to be the lower left quadrant of area 1.2. As shown in FIG. 14, area 1.2.4, labeled in its upper right corner, has 33 execution loads and 12 execution components. The areas 1.2.1, 1.2.2, 1.2.3, and 1.2.4 are defined so that the area 1.2.1 is adjacent the area 1.2.3.4, and the area 1.2.4 is adjacent to the area of the area 1.3.

At the operation S 156, a weight for the area 1.2.4 is determined by the computer. In this example, the weight for the area 1.2.4 is the number of execution loads and execution components of the area 1.2.4, or 45.

At the operation S 158, because the determined weight of the area 1.2.4 is less than weight_threshold_setting, 180, the recursive procedure is not called, and the operation S 152 is repeated for the next area, the area 1.3.

At the operation S 154, the area 1.3 is defined to be the lower right quadrant of the area 1. As shown in FIG. 14, the area 1.3, labeled in its upper left corner, has 90 execution loads and 50 execution components.

At the operation S 156, a weight for the area 1.3 is determined by the computer. In this example, the weight for the area 1.3 is the number of execution loads and execution components of the area 1.3, or 140.

At the operation S 158, because the determined weight of the area 1.3 is less than weight_threshold_setting, 180, the recursive procedure is not called, and the operation S 152 is repeated for the next area, the area 1.4.

At the operation S 154, the area 1.4 is defined to be the lower left quadrant of area 1. As shown in FIG. 14, area 1.4, labeled in its upper right corner, has 90 execution loads and 52 execution components.

At the operation S 156, a weight for the area 1.4 is determined by the computer. In this example, the weight for the area 1.4 is the number of execution loads and execution components of the area 1.4, or 142.

At the operation S 158, because the determined weight of the area 1.4 is less than weight_threshold_setting, 180, the recursive procedure is not called, and the area 1 has been split into the areas illustrated in FIG. 14. In addition, the procedure has given each of the areas an identity.

At the operation S 160, an ordered list of the areas is generated. The sequential order of the list assures that the areas sequentially adjacent in the list are physically adjacent. In this example, the list of areas is given by 1.1, 1.2.1, 1.2.2, 1.2.3.1, 1.2.3.2, 1.2.3.3, 1.2.3.4, 1.2.4, 1.3, and 1.4.

At the operation S 170, a list of job groups is generated, where each group includes one or more jobs, and where each job is associated with one of the areas of the list generated in the operation S 160. Each group of jobs is processed as a single job for the group. To generate the list of job groups, the areas created by the recursive procedure are grouped such that a density of each of the groups is similar to the density of each of the other groups, where density, in this embodiment, is defined as the number of execution loads of the group divided by the number of execution loads and execution components of the group.

Prior to performing the while loop of the operation S 170, the computer initializes GroupList, JobGroup, and NextJob. The GroupList, which is the list of job groups to be generated, is created. In addition, JobGroup 1, which will include a group of jobs, is created and added to the GroupList. Furthermore, NextJob is defined as the allocation job associated with the first area in the ordered list of the areas generated in the operation S 160—the area 1.1.

In the while loop of the operation S 170, the execution loads, the execution components, and the physical area of the area 1.1 are associated with JobGroup 1. In addition, a density for JobGroup 1 is determined, where the density is determined as the number of execution loads of JobGroup 1 (130) divided by the number of execution loads (130) and execution components (50) of JobGroup 1, or 0.72.

Once the density is determined, a determination is made to either close JobGroup 1 or to include another job to JobGroup 1. The determination is made based on the density of JobGroup 1.

In this example, the overall density in the operation S 130 (0.75) minus density_tolerance_setting (5% or 0.0375), or 0.7125 is not greater than the density of JobGroup 1 (0.72) and the density of JobGroup 1 is less than the overall density determined in the operation S 130 (0.75) and density_tolerance_setting (5% or 0.0375), or 0.7875. Therefore, the density of JobGroup 1 is adequate and JobGroup 1 is closed. In addition, new JobGroup 2 is created, and JobGroup 2 is added to GroupList. The ordered list of jobs generated in the operation S 160 is then accessed to define a new NextJob as the job associated with the area 1.2.1, the next area in the ordered list. The while loop is then performed with the new NextJob, JobGroup 2, and the modified GroupList.

In the while loop of the operation S 170, the execution loads, the execution components, and the physical area of the area 1.2.1 are associated with JobGroup 2. In addition, a density for JobGroup 2 is determined, where the density is determined as the number of execution loads of JobGroup 2 (63) divided by the number of execution loads (63) and execution components (12) of JobGroup 2, or 0.84.

Once the density is determined, a determination is made to either close JobGroup 2 or to include another job to JobGroup 2. The determination is made based on the density of JobGroup 2.

In this example, the overall density determined in the operation S 130 (0.75) and density_tolerance_setting (5% or 0.0375), or 0.7875, is less than the density of JobGroup 2 (0.84). Therefore, the density of JobGroup 2 is inadequate and JobGroup 2 is not closed. The ordered list of jobs generated in the operation S 160 is then accessed to define a new NextJob as the job associated with the area 1.2.2, the next area in the ordered list. The while loop is then performed with the new NextJob, and the same JobGroup 2.

In the while loop of the operation S 170, the execution loads, the execution components, and the physical area of the area 1.2.2 are additionally associated with JobGroup 2. In addition, a new density for JobGroup 2 is determined, where the density is determined as the number of execution loads of the areas 1.2.1 and 1.2.2 (86) are divided by the number of execution loads (86) and execution components (24) of the areas 1.2.1 and 1.2.2, or 0.782.

Once the density is determined, a determination is made to either close JobGroup 2 or to include another job to JobGroup 2. The determination is made based on the density of JobGroup 2.

In this example, the overall density determined in the operation S 130 (0.75) minus density_tolerance_setting (5% or 0.0375), or 0.7125 is not greater than the density of JobGroup 2 (0.782) and the density of JobGroup 2 (0.782) is not greater than the overall density determined in the operation S 130 (0.75) and density_tolerance_setting (5% or 0.0375), or 0.7875. Therefore, the density of JobGroup 2 is adequate and JobGroup 2 is closed. In addition, new JobGroup 3 is created, and JobGroup 3 is added to GroupList. The ordered list of jobs generated in the operation S 160 is then accessed to define a new NextJob as the job associated with the area 1.2.3.1, the next area in the ordered list. The while loop is then performed with the new NextJob, JobGroup 3, and the modified GroupList.

In the execution of the while loop of the operation S 170, the execution loads, the execution components, and the physical area of the area 1.2.3.1 are associated with JobGroup 3. In addition, a density for the JobGroup 3 is determined, where the computer determines the density as the number of execution loads of the area 1.2.3.1 divided by the number of execution loads and execution components of the area 1.2.3.1, or 13/(13+3) or 0.8125.

Once the density is determined, a determination is made to either close JobGroup 3 or to include another job to JobGroup 3. The determination is made based on the density of JobGroup 3.

In this example, the overall density determined in the operation S 130 (0.75) and density_tolerance_setting (5% or 0.0375), or 0.7875, is less than the density of JobGroup 3 (0.8125). Therefore, the density of JobGroup 3 is inadequate and JobGroup 3 is not closed. The ordered list of jobs generated in the operation S 160 is then accessed to define a new NextJob as the job associated with the area 1.2.3.2, the next area in the ordered list. The while loop is then performed with the new NextJob, and the same JobGroup 3.

In the while loop of the operation S 170, the execution loads, the execution components, and the physical area of the area 1.2.3.2 are additionally associated with JobGroup 3. In addition, a new density for the JobGroup 3 is determined, where the computer determines the density as the number of execution loads of the areas 1.2.3.1 and 1.2.3.2 divided by the number of execution loads and execution components of the areas 1.2.3.1 and 1.2.3.2, or 23/(23+5) or 0.82.

Once the density is determined, the computer makes a determination to either close JobGroup 3 or include another job to JobGroup 3. The determination is made based on the density of JobGroup 3.

In this example, the overall density determined in the operation S 130 (0.75) and density_tolerance_setting (5% or 0.0375), or 0.7875, is less than the density of the JobGroup 3 (0.82). Therefore, the density of the JobGroup 3 is inadequate and the JobGroup 3 is not closed. The ordered list of jobs generated in the operation S 160 is then accessed to define a new NextJob as the job that is associated with the area 1.2.3.3, the next area in the ordered list. The while loop is then performed with the new NextJob, and the same JobGroup 3.

In the while loop of the operation S 170, the execution loads, the execution components, and the physical area of the area 1.2.3.3 are additionally associated with JobGroup 3. In addition, a new density for the JobGroup 3 is determined, where the computer determines the density as the number of execution loads of the areas 1.2.3.1, 1.2.3.2, and 1.2.3.3 divided by the number of execution loads and execution components of the areas 1.2.3.1, 1.2.3.2, and 1.2.3.3, or 32/(32+9) or 0.780.

Once the density is determined, a determination is made to either close JobGroup 3 or to include another job to JobGroup 3. The determination is made based on the density of JobGroup 3.

In this example, the overall density determined in the operation S 130 (0.75) minus density_tolerance_setting (5% or 0.0375), or 0.7125 is not greater than the density of JobGroup 3 (0.780) and the density of JobGroup 3 (0.780) is not greater than the overall density determined in the operation S 130 (0.75) and density_tolerance_setting (5% or 0.0375), or 0.7875. Therefore, the density of JobGroup 3 is adequate and JobGroup 3 is closed. In addition, new JobGroup 4 is created, and JobGroup 4 is added to GroupList. The ordered list of jobs generated in the operation S 160 is then accessed to define a new NextJob as the job associated with the area 1.2.3.4, the next area in the ordered list. The while loop is then performed with the new NextJob, JobGroup 4, and the modified GroupList.

In the while loop of the operation S 170, the execution loads, the execution components, and the physical area of the area 1.2.3.4 are associated with JobGroup 4. In addition, a density for the JobGroup 4 is determined, where the computer determines the density as the number of execution loads of the area 1.2.3.4 divided by the number of execution loads and execution components of the area 1.2.3.4, or 141/(141+3) or 0.98.

Once the computer determines the density, the computer makes a determination to either close the JobGroup 4 or to include another job to the JobGroup 4. The computer makes the determination based on the density of the JobGroup 4.

In this example, the overall density determined in the operation S 130 (0.75) and density_tolerance_setting (5% or 0.0375), or 0.7875, is less than the density of JobGroup 4 (0.98). Therefore, the density of JobGroup 4 is inadequate and JobGroup 4 is not closed. The ordered list of jobs generated in the operation S 160 is then accessed to define a new NextJob as the job associated with the area 1.2.4, the next area in the ordered list. The while loop is then performed with the new NextJob, and the same JobGroup 4.

In the while loop of the operation S 170, the execution loads, the execution components, and the physical area of the area 1.2.4 are additionally associated with JobGroup 4. In addition, a new density for the JobGroup 4 is determined, where the computer determines the density as the number of execution loads of the areas 1.2.3.4 and 1.2.4 divided by the number of execution loads and execution components of the areas 1.2.3.4 and 1.2.4, or 174/(174+15) or 0.92.

Once the density is determined, a determination is made to either close JobGroup 4 or to include another job to JobGroup 4. The determination is made based on the density of JobGroup 4.

In this example, the overall density determined in the operation S 130 (0.75) and density_tolerance_setting (5% or 0.0375), or 0.7875, is less than the density of JobGroup 4 (0.92). Therefore, the density of JobGroup 4 is inadequate and JobGroup 4 is not closed. The ordered list of jobs generated in the operation S 160 is then accessed to define a new NextJob as the job associated with the area 1.3, the next area in the ordered list. The while loop is then performed with the new NextJob, and the same JobGroup 4.

In the while loop of the operation S 170, the execution loads, the execution components, and the physical area of the area 1.3 are additionally associated with JobGroup 4. In addition, a new density for the JobGroup 4 is determined, where the computer determines the density as the number of execution loads of the areas 1.2.3.4, 1.2.4, and 1.3 divided by the number of execution loads and execution components of the areas 1.2.3.4, 1.2.4, and 1.3, or 264/(264+65) or 0.80.

Once the density is determined, a determination is made to either close JobGroup 4 or to include another job to JobGroup 4. The determination is made based on the density of JobGroup 4.

In this example, the overall density determined in the operation S 130 (0.75) and density_tolerance_setting (5% or 0.0375), or 0.7875, is less than the density of JobGroup 4 (0.80). Therefore, the density of JobGroup 4 is inadequate and JobGroup 4 is not closed. The ordered list of jobs generated in the operation S 160 is then accessed to define a new NextJob as the job associated with the area 1.4, the next area in the ordered list. The while loop is then performed with the new NextJob, and the same JobGroup 4.

In the while loop of the operation S 170, the execution loads, the execution components, and the physical area of the area 1.4 are additionally associated with JobGroup 4. In addition, a new density for the JobGroup 4 is determined, where the computer determines the density as the number of execution loads of the areas 1.2.3.4, 1.2.4, 1.3, and 1.4 divided by the number of execution loads and execution components of the areas 1.2.3.4, 1.2.4, 1.3, and 1.4, or 264/(264+65) or 0.751.

Once the density is determined, a determination is made to either close JobGroup 4 or to include another job to JobGroup 4. The determination is made based on the density of JobGroup 4.

In this example, the overall density determined in the operation S 130 (0.75) minus density_tolerance_setting (5% or 0.0375), or 0.7125 is not greater than the density of JobGroup 4 (0.751) and the density of JobGroup 4 (0.751) is not greater than the overall density determined in the operation S 130 (0.75) and density_tolerance_setting(5% or 0.0375), or 0.7875. Therefore, the density of JobGroup 4 is adequate and JobGroup 4 is closed. In addition, new JobGroup 5 is created, and JobGroup 5 is added to GroupList. The ordered list of jobs generated in the operation S 160 is then accessed to define a new NextJob. However, there are no additional the areas in the list, and the while loop is not performed.

The operation S 170 concludes having generated a list of job groups, where each of the groups represents an execution load/execution component link generation job to be processed. In this example, the list includes JobGroup 1, JobGroup 2, JobGroup 3, and JobGroup 4. Each of these jobs may be processed using a method described or referenced herein. In some embodiments, these jobs may be processed serially, and in alternative embodiments, one or more of these jobs may be processed in parallel.

Figure 15:
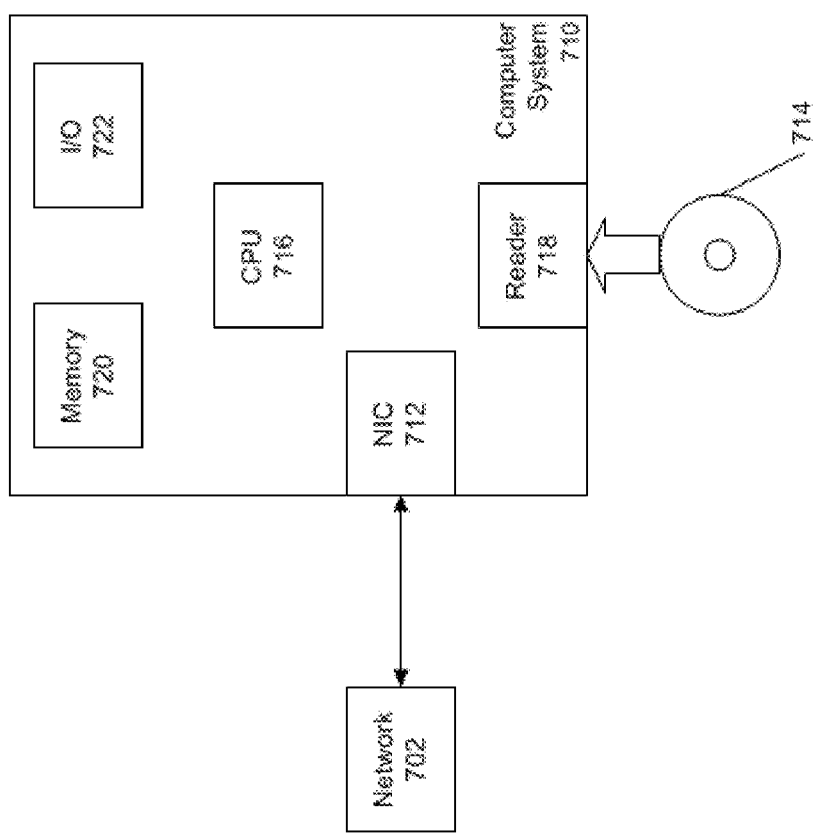
FIG. 15 shows a configuration for a computer system constructed in accordance with the present disclosure.

FIG. 15 shows a configuration for a computer system 710 constructed in accordance with the present disclosure to perform the operations disclosed herein. The computer system 710 can comprise a system such as a personal computer or server computer or the like. The computer system 710 may include a network communication interface 712 that permits communications with a network 702. The network interface can comprise a network interface card (NIC). The computer system 710 can execute instructions to provide a computer system which performs various aspects and principles of the methods and features described herein. For example, each of the components 2, 4, 6, 8 in FIG. 1 may be implemented by one or more of the computer systems 710.

The computer system 710 includes a central processor unit 716 (CPU) and a program product reader 718 for receiving a program product media and reading program instructions recorded thereon, where the instructions, when executed by the computer cause the computer to perform various aspects and principles of the methods and features described herein. The computer system also includes associated memory 720 and input/output facilities 722, such as a display for output and a keyboard and/or mouse for input. The processor 716 of the computer system 710 can receive program instructions into the program memory of the processor. The program instructions can be received directly, such as by flashing EEPROM of the processor, or can be received through the network interface 712, such as by download from a connected device or over a WAN or LAN network communication. If desired, the program instructions can be stored on a computer program product 714 that is read by the computer system 710 so that the program instructions can thereafter executed. That is, the program product 714 is for use in a system such as the computer system 710, wherein the program product comprises a tangible, non-transitory recordable media containing a program of computer-readable instructions that are executable by the device processor 704 to perform the operations described herein. The program product 714 can comprise, for example, optical program media such as CD or DVD data discs, or flash memory drives, or external memory stores, or floppy magnetic disks, and the like.

The present invention has been described above in terms of presently preferred embodiments so that an understanding of the present invention can be conveyed. There are, however, many configurations for network devices and management systems not specifically described herein but with which the present invention is applicable. The present invention should therefore not be seen as limited to the particular embodiments described herein, but rather, it should be understood that the present invention has wide applicability with respect to network devices and management systems generally. All modifications, variations, or equivalent arrangements and implementations should therefore be considered within the scope of the invention.

What is claimed is:

1. A method of generating links between a plurality of data packets corresponding with execution loads to a plurality of data packets corresponding with execution components, the data packets corresponding with execution loads and the data packets corresponding with execution components being part of a first execution load to execution component link generation job, the method comprising:

calculating an overall metric of the first execution load to execution component link generation job, wherein the overall metric is determined based at least in part on a quantity of execution loads of the first execution load to execution component link generation job and a quantity of execution components of the first execution load to execution component link generation job;

splitting the first execution load to execution component link generation job into a plurality of smaller execution load to execution component link generation jobs, wherein each of the smaller execution load to execution component link generation jobs comprises a plurality of execution loads and execution components wherein each particular smaller execution load to execution component link generation job has a job metric determined based at least in part on the quantity of execution loads of the particular smaller execution load to execution component link generation job and the quantity of execution components of the particular smaller execution load to execution component link generation job, and wherein a difference between the job metric of each of the smaller execution load to execution component link generation jobs and the overall metric of the first execution load to execution component link generation job is less than a metric threshold;

solving each smaller execution load to execution component link generation jobs, whereby links are generated between the data packets corresponding with execution loads of each smaller execution load to execution component link generation job and the data packets corresponding with execution components of each smaller execution load to execution component link generation job; and communicating the generated links to the corresponding execution components, wherein the overall metric is an overall density, and wherein the job metric are job densities, wherein the overall density is the quantity of execution loads of the execution load to execution component link generation job divided by a sum of the execution loads and execution components of the execution load to execution component link generation job, and wherein a job density of each particular smaller execution load to execution component link generation job is the quantity of execution loads of the particular smaller execution load to execution component link generation job divided by a sum of the execution load and execution components of the particular smaller execution load to execution component link generation job.

2. The method of claim 1, wherein a physical region corresponding with each particular smaller execution load to execution component link generation job is contiguous.

3. The method of claim 1, wherein the first execution load to execution component link generation job corresponds with a physical region, and wherein splitting the first execution load to execution component link generation job into a plurality of smaller execution load to execution component link generation jobs comprises:

splitting the physical region of the first execution load to execution component link generation job into a plurality of sections, wherein each section has a physical region and has one or more execution loads and execution components therein, and wherein a sum of execution loads and execution components within each section is less than a quantity threshold; and selecting one or more of the sections for each smaller execution load to execution component link generation job, wherein each smaller execution load to execution component link generation job comprises the execution loads and execution components of the selected sections.

4. The method of claim 3, wherein splitting the physical region of the first execution load to execution component link generation job into a plurality of sections comprises:

splitting the physical region of the first execution load to execution component link generation job into four areas, wherein each area has one or more execution loads and execution components therein;

determining the quantity of execution loads and execution components of each particular area;

subsplitting each particular area having a sum of execution loads and execution components greater than the quantity threshold into four sub-areas;

determining the quantity of execution loads and execution components of each particular sub-area;

subsplitting each particular sub-area having a sum of execution loads and execution components greater than the quantity threshold into four additional sub-areas;

determining the quantity of execution loads and execution components of each particular additional sub-area; and subsplitting each particular additional sub-area having a sum of execution loads and execution components greater than the quantity threshold into four additional sub-areas, until all sub-areas and additional sub-areas have a sum of execution loads and execution components less than or equal to the quantity threshold.

5. The method of claim 4, wherein the four areas are substantially equal in size.

6. The method of claim 3, wherein selecting the sections for each smaller execution load to execution component link generation job comprises:

generating an ordered list of sections;

adding a first section from the ordered list to a particular smaller execution load to execution component link generation job;

calculating a job metric for the particular smaller execution load to execution component link generation job;

calculating a difference between the determined job metric of the particular smaller execution load to execution component link generation job and the overall metric of the first execution load to execution component link generation job;

in response to the calculated difference being greater than the metric threshold, adding a next section from the ordered list to the particular smaller execution load to execution component link generation job; and in response to the calculated difference being less than the metric threshold, generating a next smaller execution load to execution component link generation job.

7. A computer system, comprising:

a processor; and a memory, comprising instructions, which, when executed by the processor, cause the computer system to perform a method of generating links between a plurality of data packets corresponding with execution loads to a plurality of data packets corresponding with execution components, the data packets corresponding with execution loads and the data packets corresponding with execution components being part of a first execution load to execution component link generation job, the method comprising:

calculating an overall metric of the first execution load to execution component link generation job, wherein the overall metric is determined based at least in part on a quantity of execution loads of the first execution load to execution component link generation job and a quantity of execution components of the first execution load to execution component link generation job;

splitting the first execution load to execution component link generation job into a plurality of smaller execution load to execution component link generation jobs, wherein each of the smaller execution load to execution component link generation jobs comprises a plurality of execution loads and execution components wherein each particular smaller execution load to execution component link generation job has a job metric determined based at least in part on the quantity of execution loads of the particular smaller execution load to execution component link generation job and the quantity of execution components of the particular smaller execution load to execution component link generation job, and wherein a difference between the job metric of each of the smaller execution load to execution component link generation jobs and the overall metric of the first execution load to execution component link generation job is less than a metric threshold;

solving each smaller execution load to execution component link generation jobs, whereby links are generated between the data packets corresponding with execution loads of each smaller execution load to execution component link generation job and the data packets corresponding with execution components of each smaller execution load to execution component link generation job; and communicating the generated links to the corresponding execution components, wherein the overall metric is an overall density, and wherein the job metric are job densities, wherein the overall density is the quantity of execution loads of the execution load to execution component link generation job divided by a sum of the execution loads and execution components of the execution load to execution component link generation job, and wherein the job density of each particular smaller execution load to execution component link generation job is the quantity of execution loads of the particular smaller execution load to execution component link generation job divided by a sum of the execution loads and execution components of the particular smaller execution load to execution component link generation job.

8. The computer system of claim 7, wherein a physical region of each particular smaller execution load to execution component link generation job is contiguous.

9. The computer system of claim 7, wherein the first execution load to execution component link generation job corresponds with a physical region, and wherein splitting the first execution load to execution component link generation job into a plurality of smaller execution load to component link generation jobs comprises:

splitting the physical region of the first execution load to execution component link generation job into a plurality of sections, wherein each section has a physical region and has one or more execution loads and execution components therein, and wherein a sum execution loads and execution components within each section is less than a quantity threshold; and selecting one or more of the sections for each smaller execution load to execution component link generation job, wherein each smaller execution load to execution component link generation job comprises the execution loads and execution components of the selected sections.

10. The computer system of claim 9, wherein splitting the physical region of the first execution load to execution component link generation job into a plurality of sections comprises:

splitting the physical region of the first execution load to execution component link generation job into four areas, wherein each area has one or more execution loads and execution components therein;

determining the sum of execution loads and execution components of each particular area;

subsplitting each particular area having a sum of execution loads and execution components greater than the quantity threshold into four sub-areas;

determining the quantity of execution loads and execution components of each particular sub-area;

subsplitting each particular sub-area having a sum of execution loads and execution components greater than the quantity threshold into four additional sub-areas;

determining the quantity of execution loads and execution components of each particular additional sub-area; and subsplitting each particular additional sub-area having a sum of execution loads and execution components greater than the quantity threshold into four additional sub-areas, until all sub-areas and additional sub-areas have a sum of execution loads and execution components less than or equal to the quantity threshold.

11. The computer system of claim 10, wherein the four areas are substantially equal in size.

12. The computer system of claim 9, wherein selecting the sections for each smaller execution load to execution component link generation job comprises:

generating an ordered list of sections;

adding a first section from the ordered list to a particular smaller execution load to execution component link generation job;

calculating a job metric for the particular smaller execution load to execution component link generation job;

calculating a difference between the determined job metric of the particular smaller execution load to execution component link generation job and the overall metric of the first execution load to execution component link generation job;

in response to the calculated difference being greater than the metric threshold, adding a next section from the ordered list to the particular smaller execution load to execution component link generation job; and in response to the calculated difference being less than the metric threshold, generating a next smaller execution load to execution component link generation job.

13. A computer readable medium comprising non-transient instructions, which, when executed by a computer system cause the computer system to perform a method of generating links between a plurality of data packets corresponding with execution loads to a plurality of data packets corresponding with execution components, the data packets corresponding with execution loads and the data packets corresponding with execution components being part of a first execution load to execution component link generation job, the method comprising:

calculating an overall metric of the first execution load to execution component link generation job, wherein the overall metric is determined based at least in part on a quantity of execution loads of the first execution load to execution component link generation job and a quantity of execution components of the first execution load to execution component link generation job;

splitting the first execution load to execution component link generation job into a plurality of smaller execution load to execution component link generation jobs, wherein each of the smaller execution load to execution component link generation jobs comprises a plurality of execution loads and execution components wherein each particular smaller execution load to execution component link generation job has a job metric determined based at least in part on the quantity of execution loads of the particular smaller execution load to execution component link generation job and the quantity of execution components of the particular smaller execution load to execution component link generation job, and wherein a difference between the job metric of each of the smaller execution load to execution component link generation jobs and the overall metric of the first execution load to execution component link generation job is less than a metric threshold;

solving each smaller execution load to execution component link generation jobs, whereby links are generated between the data packets corresponding with execution loads of each smaller execution load to execution component link generation job and the data packets corresponding with execution components of each smaller execution load to execution component link generation job; and communicating the generated links to the corresponding execution components, wherein the overall metric is an overall density, and wherein the job metric are job densities, wherein the overall density is the quantity of execution loads of the execution load to execution component link generation job divided by a sum of the execution loads and execution components of the execution load to execution component link generation job, and wherein the job density of each particular smaller execution load to execution component link generation job is the quantity of execution loads of the particular smaller execution load to execution component link generation job divided by a sum of the execution loads and execution components of the particular smaller execution load to execution component link generation job.

14. The computer readable medium of claim 13, wherein a physical region of each particular smaller execution load to execution component link generation job is contiguous.

15. The computer readable medium of claim 13, wherein the first execution load to execution component link generation job corresponds with a physical region, and wherein splitting the first execution load to execution component link generation job into a plurality of smaller execution load to execution component link generation jobs comprises:

splitting the physical region of the first execution load to execution component link generation job into a plurality of sections, wherein each section has a physical region and has one or more execution loads and execution components therein, and wherein a sum of execution loads and execution components within each section is less than a quantity threshold; and selecting one or more of the sections for each smaller execution load to execution component link generation job, wherein each smaller execution load to execution component link generation job comprises the execution loads and execution components of the selected sections.

16. The computer readable medium of claim 15, wherein splitting the physical region of the first execution load to execution component link generation job into a plurality of sections comprises:

splitting the physical region of the first execution load to execution component link generation job into four areas, wherein each area has one or more execution loads and execution components therein;

determining the sum of execution loads and execution components of each particular area;

subsplitting each particular area having a quantity of execution loads and execution components greater than the quantity threshold into four sub-areas;

determining the quantity of execution loads and execution components of each particular sub-area;

subsplitting each particular sub-area having a sum of execution loads and execution components greater than the quantity threshold into four additional sub-areas;

determining the quantity of execution loads and execution components of each particular additional sub-area; and subsplitting each particular additional sub-area having a sum of execution loads and execution components greater than the quantity threshold into four additional sub-areas, until all sub-areas and additional sub-areas have a sum of execution loads and execution components less than or equal to the quantity threshold.

17. The computer readable medium of claim 16, wherein the four areas are substantially equal in size.

18. The computer readable medium of claim 15, wherein selecting the sections for each smaller execution load to execution component link generation job comprises:

generating an ordered list of sections;

adding a first section from the ordered list to a particular smaller execution load to execution component link generation job;

calculating a job metric for the particular smaller execution load to execution component link generation job;

calculating a difference between the determined job metric of the particular smaller execution load to execution component link generation job and the overall metric of the first execution load to execution component link generation job;

in response to the calculated difference being greater than the metric threshold, adding a next section from the ordered list to the particular smaller execution load to execution component link generation job; and in response to the calculated difference being less than the metric threshold, generating a next smaller execution load to execution component link generation job.

* * * * *